US012608677B1

(12) United States Patent　　(10) Patent No.:　US 12,608,677 B1
Shekhar et al.　　　　　　　　　　(45) Date of Patent:　　Apr. 21, 2026

(54) SYSTEM AND METHOD OF MIXED-REALITY VISUALIZATION AND ANALYSIS OF MULTI-DIMENSIONAL SEGMENTATION

(71) Applicant: Blue Yonder Group, Inc., Scottsdale, AZ (US)

(72) Inventors: Tushar Shekhar, Bangalore (IN); Ganesh Muthusamy, Hyderabad (IN); Abhishek Singh, Bangalore (IN); Mayank Tiwari, Telangana (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 231 days.

(21) Appl. No.: 17/705,228

(22) Filed: Mar. 25, 2022

Related U.S. Application Data

(63) Continuation-in-part of application No. 17/582,350, filed on Jan. 24, 2022, now Pat. No. 12,423,631.

(Continued)

(51) Int. Cl.
　　G06Q 10/087　　　(2023.01)
　　G06F 16/26　　　　(2019.01)
　　　　　　(Continued)

(52) U.S. Cl.
　　CPC ........... G06Q 10/087 (2013.01); G06F 16/26 (2019.01); G06T 19/006 (2013.01); G06N 20/00 (2019.01)

(58) Field of Classification Search
　　CPC ..... G06Q 10/087; G06F 16/26; G06T 19/006; G06N 20/00

(Continued)

(56) References Cited

U.S. PATENT DOCUMENTS

| | | | |
|---|---|---|---|
| 7,523,483 B2 * | 4/2009 | Dogan ................ | G06Q 10/087 726/1 |
| 10,366,362 B1 * | 7/2019 | Reddy ................. | G06Q 10/067 |

(Continued)

FOREIGN PATENT DOCUMENTS

| | | | | |
|---|---|---|---|---|
| GB | 2465476 A | * | 5/2010 | .......... G06Q 10/087 |
| JP | 6646659 B2 | * | 2/2020 | ............ G09G 3/003 |

OTHER PUBLICATIONS

Fichtinger et al., "A joint network design and multi-echelon inventory optimisation approach for supply chain segmentation," International Journal of Production Economics, vol. 209, pp. 103-111, 2017.

(Continued)

*Primary Examiner* — Abdallah A El-Hage Hassan
(74) *Attorney, Agent, or Firm* — Spencer Fane LLP; Steven J. Laureanti

(57)　　　　　ABSTRACT

A system and method of mixed-reality visualization and analysis of multi-dimensional segmentation for a supply chain network. Embodiments include a supply chain network having supply chain entities and a planner. The planner accesses input data relating to the supply chain entities, discovers features related to the input data, pre-processes the input data and features, performs multi-dimension segmentation on the input data, computes the importance of the features, generates a multi-dimension segmentation visualization, and displays the multi-dimension segmentation visualization. The planner further assigns policy parameters to the multi-dimension segmentation performed on the input data, detects outliers in the multi-dimension segmentation visualization, generates a mixed-reality visualization having clusters and segmentation data displayed on three-dimensional mixed-reality objects. Embodiments further including a mixed-reality visualization system that displays a quantity (Continued)

of the three-dimensional mixed-reality objects equal to the number of dimensions of the segmentation data.

20 Claims, 9 Drawing Sheets

Related U.S. Application Data

(60)  Provisional application No. 63/173,769, filed on Apr. 12, 2021, provisional application No. 63/146,086, filed on Feb. 5, 2021, provisional application No. 63/140,337, filed on Jan. 22, 2021.

(51)  Int. Cl.
      *G06N 20/00*      (2019.01)
      *G06T 19/00*      (2011.01)

(58)  Field of Classification Search
      USPC ......................................................... 705/28
      See application file for complete search history.

(56) References Cited

U.S. PATENT DOCUMENTS

| | | | | |
|---|---|---|---|---|
| 11,397,957 | B1 * | 7/2022 | Najmi | G06Q 10/06393 |
| 11,615,498 | B2 * | 3/2023 | R | G06Q 10/08 |
| | | | | 345/440 |
| 2018/0232952 | A1 * | 8/2018 | Hiranandani | G06Q 30/0641 |
| 2019/0266910 | A1 * | 8/2019 | Kang | G06T 7/33 |
| 2021/0158259 | A1 * | 5/2021 | Evans | G06Q 10/04 |
| 2021/0174492 | A1 * | 6/2021 | Karaaslan | G06T 7/11 |
| 2023/0153753 | A1 * | 5/2023 | Rochon | G06Q 10/087 |
| | | | | 705/28 |

OTHER PUBLICATIONS

Godsell et al., "Enabling supply chain segmentation through demand profiling," International Journal of Physical Distribution & Logistics Management, vol. 41, Issue 3, pp. 296-314, 2011.

* cited by examiner

300

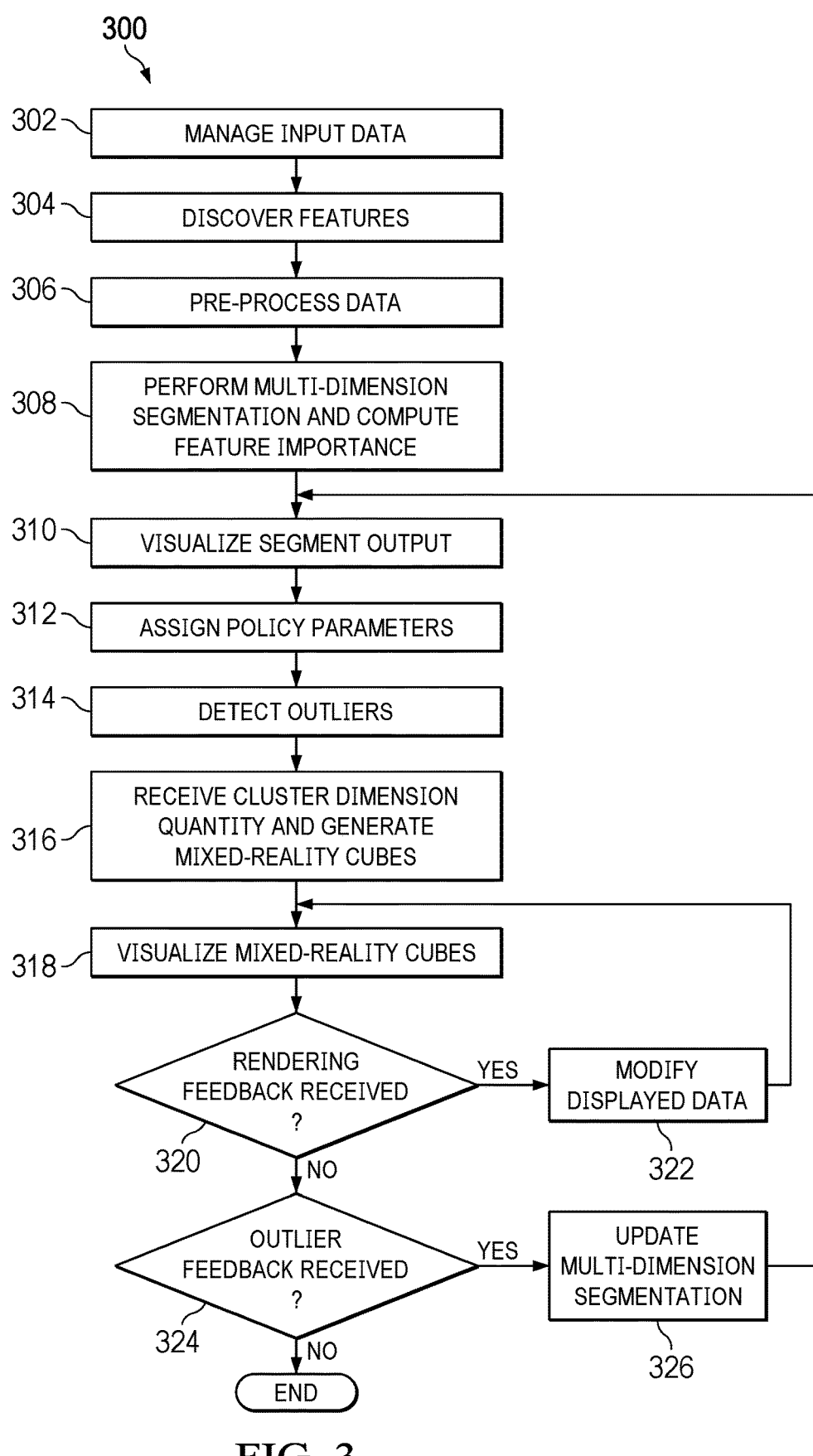

302 — MANAGE INPUT DATA

304 — DISCOVER FEATURES

306 — PRE-PROCESS DATA

308 — PERFORM MULTI-DIMENSION SEGMENTATION AND COMPUTE FEATURE IMPORTANCE

310 — VISUALIZE SEGMENT OUTPUT

312 — ASSIGN POLICY PARAMETERS

314 — DETECT OUTLIERS

316 — RECEIVE CLUSTER DIMENSION QUANTITY AND GENERATE MIXED-REALITY CUBES

318 — VISUALIZE MIXED-REALITY CUBES

320 — RENDERING FEEDBACK RECEIVED ?

YES → 322 — MODIFY DISPLAYED DATA

NO

324 — OUTLIER FEEDBACK RECEIVED ?

YES → 326 — UPDATE MULTI-DIMENSION SEGMENTATION

NO → END

FIG. 3

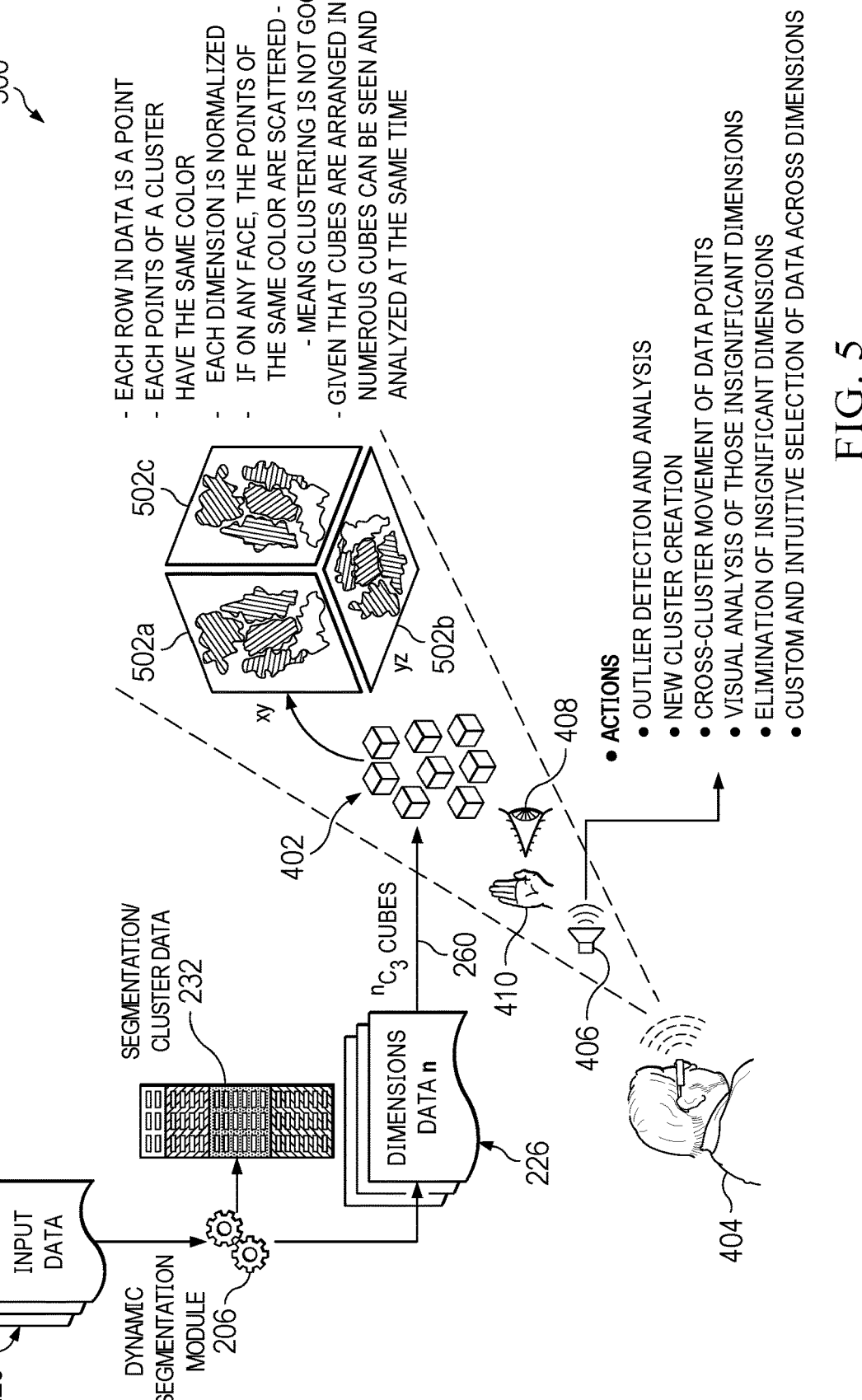

500

- EACH ROW IN DATA IS A POINT
- EACH POINTS OF A CLUSTER HAVE THE SAME COLOR
- EACH DIMENSION IS NORMALIZED
- IF ON ANY FACE, THE POINTS OF THE SAME COLOR ARE SCATTERED - MEANS CLUSTERING IS NOT GOOD
- GIVEN THAT CUBES ARE ARRANGED IN 3D, NUMEROUS CUBES CAN BE SEEN AND ANALYZED AT THE SAME TIME 502c
502a
502b
xy
yz

402

$^{n}C_{3}$ CUBES

260

DIMENSIONS DATA n

226

408

410

406

404

SEGMENTATION/ CLUSTER DATA
232

INPUT DATA

220

DYNAMIC SEGMENTATION MODULE
206

● ACTIONS
  ● OUTLIER DETECTION AND ANALYSIS
  ● NEW CLUSTER CREATION
  ● CROSS-CLUSTER MOVEMENT OF DATA POINTS
  ● VISUAL ANALYSIS OF THOSE INSIGNIFICANT DIMENSIONS
  ● ELIMINATION OF INSIGNIFICANT DIMENSIONS
  ● CUSTOM AND INTUITIVE SELECTION OF DATA ACROSS DIMENSIONS

FIG. 5

SYSTEM AND METHOD OF MIXED-REALITY VISUALIZATION AND ANALYSIS OF MULTI-DIMENSIONAL SEGMENTATION

CROSS-REFERENCE TO RELATED APPLICATIONS

This application is a continuation-in-part of U.S. patent application Ser. No. 17/582,350, filed on Jan. 24, 2022, entitled "Autonomous Multi-Dimension Segmentation User Interface Workflow," which claims the benefit under 35 U.S.C. § 119 (e) to U.S. Provisional Application No. 63/140, 337 filed Jan. 22, 2021, entitled "Autonomous Multi-Dimension Segmentation Workflow" and U.S. Provisional Application No. 63/146,086 filed Feb. 5, 2021, entitled "Autonomous Multi-Dimension Segmentation User Interface Workflow". The present disclosure is also related to that disclosed in U.S. Provisional Application No. 63/173,769, filed Apr. 12, 2021, entitled "System and Method of Mixed-Reality Visualization and Analysis of Multi-Dimensional Segmentation. U.S. patent application Ser. No. 17/582,350 and U.S. Provisional Application Nos. 63/140,337, 63/146, 086, and 63/173,769 are assigned to the assignee of the present application. The present invention hereby claims priority under 35 U.S.C. § 119 (e) to U.S. Provisional Application No. 63/173,769.

TECHNICAL FIELD

The present disclosure relates generally to segmentation planning and specifically to visualization and analysis of multi-dimensional segmentation using mixed-reality.

BACKGROUND

Segmentation refers to the process of dividing one or more target markets into sub-sections, or segments, that can be targeted with specific products, communications and communication channels, supply chain logistical procedures, and/or other business processes. A business entity may segment a market based on one or more of many possible segmentation features, including but not limited to geographic features (such as customer location, state, rural-urban, etc.), demographic features (such as customer gender, age, or job), behavioral features (such as products tailored towards impulse purchases), and psychological features (such as products designed to appeal to "green" consumers by reducing environmental impact on the planet). A segmentation planner's choice of segments, and the features used to define or select each segment, may also be based on one or more attributes or features of one or more products to be sold to different segments of the market. By way of example and not by way of limitation, attributes or features may include, for one or more products, unit cost, location type, item forecast volume, item historical quantity, coefficient of variability, cumulative demand, and/or any other attribute or features. However, over-segmenting a market based on too many features or attributes may over-complicate supply chain models and plans intended to service the over-segmented market, and under-segmenting a market may improperly mix customers, retailers, suppliers, and manufacturers together into broad segments that fail to account for unique market contours of the customers and business entities. Even initially-correct market segmentation decisions may become out of date quickly as new customers and businesses enter and exit the market faster than the segmentation decisions can be updated. These outcomes lead to inefficient allocation of supply chain inventory and sub-optimal service levels, and are undesirable.

Further, modern supply chains are complex interconnected systems operating across continents or around the world. Achieving the best supply chain performance requires planning the optimized usage of resources, materials, and assets as well as adjusting the usage to respond in real-time to events that change or disrupt the plan. Supply chain analytics and real-time supply chain data are used to provide the insight necessary to generate plans and adjustments that are precise, accurate, and timely. However, creating a useful, and easy-to-understand visualization of supply chain analytics with interactive real-time supply chain data has proven difficult due to the intercontinental and global distribution of supply chain resources, materials, and assets as well as the local, regional, and global effects of demographics, climate, and geography of real-world locations. The inability to interact with supply chain data in real time in connection with a visualization of supply chain analytics for a large supply chain is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 3 illustrates an exemplary segment/cluster generation, visualization, and analysis method, in accordance with an embodiment;

FIG. 5 illustrates a workflow for an exemplary mixed-reality visualization, in accordance with an embodiment;

DETAILED DESCRIPTION

Figure 1:
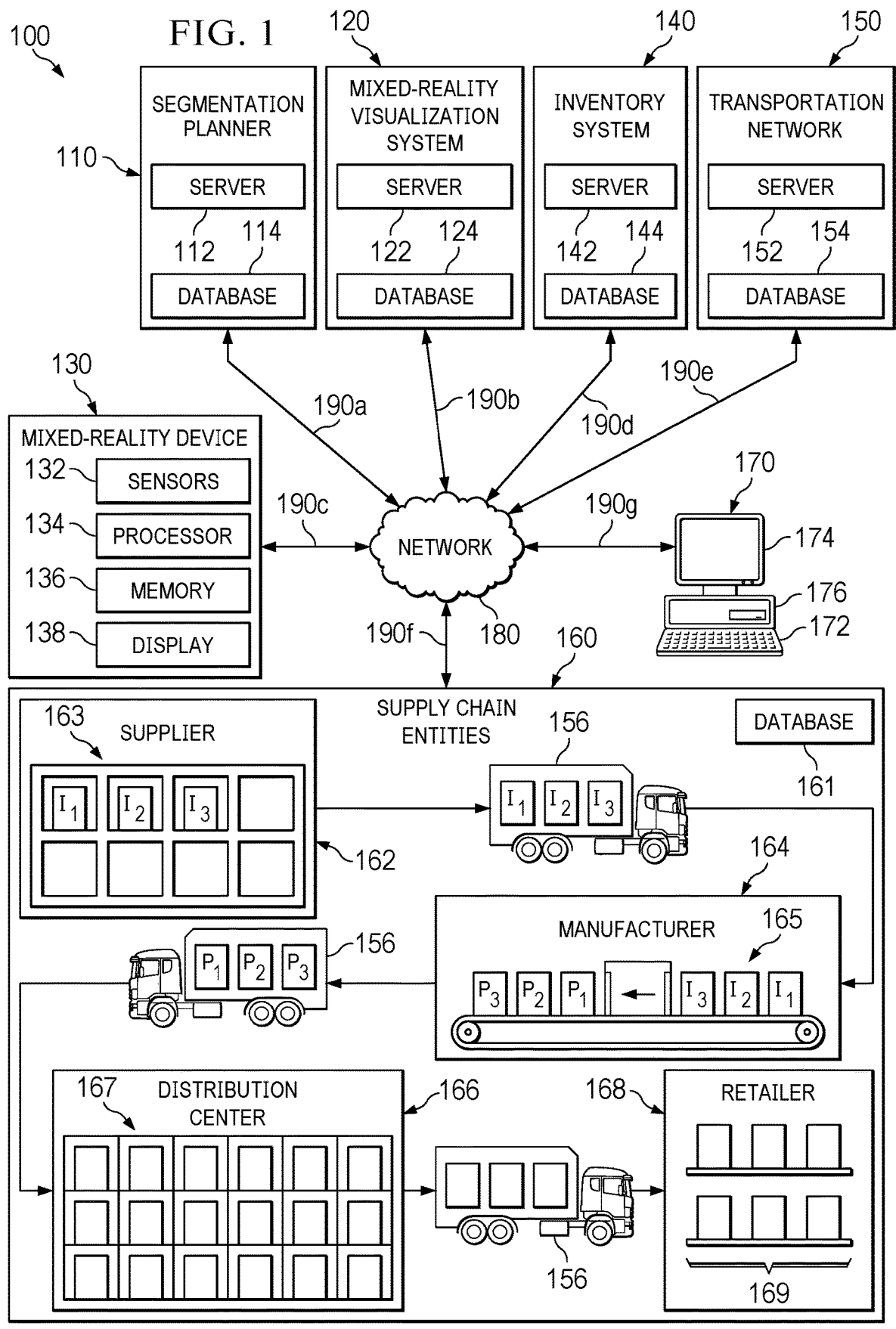
FIG. 1 illustrates an exemplary supply chain network in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a mixed-reality visualization system for autonomous multi-dimension segmentation to provide dynamic, adaptable market segmentation decisions for supply chain networks and business environments. Embodiments utilize a segmentation planner to manage input data, discover segmentation features relevant to input data, and pre-process the data before generating segments and clusters. Embodiments of the mixed-reality visualization system display visualizations, analysis, and insights from the segmentations and cluster data received from the segmentation planner.

FIG. 1 illustrates an exemplary supply chain network 100 in accordance with a first embodiment. Supply chain network 100 comprises segmentation planner 110, mixed-reality visualization system 120, one or more mixed-reality devices 130, inventory system 140, transportation network 150, one or more supply chain entities 160, computer 170, network 180, and communication links 190*a*-190*g*. Although a single segmentation planner 110, single mixed-reality visualization system 120, one or more mixed-reality devices 130, single inventory system 140, single transportation network 150, one or more supply chain entities 160, single computer 170, and single network 180 are shown and described, embodiments contemplate any number of segmentation planners 110, mixed-reality visualization systems 120, mixed-reality devices 130, inventory systems 140, transportation networks 150, supply chain entities 160, computers 170, or networks 180, according to particular needs.

In one embodiment, segmentation planner 110 comprises server 112 and database 114. As described in more detail below, segmentation planner 110 comprises one or more modules to, for example, perform a multi-dimension segmentation to discover segmentation features, generate segments and clusters, compute the importance of one or more segmentation features, visualize the generated segments and clusters, detect outliers in the generated segments and clusters, and generate for display on mixed-reality device 130, a set of n-dimensional cubes.

Segmentation refers to the process of dividing one or more target markets into sub-sections, or segments, that can be targeted with specific products, communications and communication channels, supply chain logistical procedures, and/or other business processes. A business entity may segment a market based on one or more of many possible segmentation features, including but not limited to geographic features (such as customer location, state, rural-urban, etc.), demographic features (such as customer gender, age, or job), behavioral features (such as products tailored towards impulse purchases), and psychological features (such as products designed to appeal to "green" consumers by reducing environmental impact on the planet). A segmentation planner's choice of segments, and the features used to define or select each segment, may also be based on one or more attributes or features of one or more products to be sold to different segments of the market. By way of example and not by way of limitation, attributes or features may include, for one or more products, unit cost, location time, item forecast volume, item historical quantity, coefficient of variability, cumulative demand, and/or any other attribute or features.

Embodiments enable segmentation planners 110 to segment markets efficiently and automatically, selecting a sufficient number of segmentation features to adequately segment a market without over-granulizing the market with unnecessary segmentation features. Embodiments autonomously update segmentation decisions as new data become available, circumstances change, and as customers and other businesses enter and exit the market over time, without requiring significant human intervention and/or oversight. Embodiments automatically detect the presence of non-critical features and segments and remove non-critical features and segments from segmentation planning to reduce operating expenses. In addition, or as an alternative, mixed-reality visualization system 120 generates mixed-reality visualizations of one or more segments, clusters, outliers, analytics, and the like and provides for mixed-reality interactions and manipulations of the displayed visualizations.

Mixed-reality visualization system 120 comprises server 122 and database 124. Server 122 of mixed-reality visualization system 120 comprises one or more modules that generate a mixed-reality environment (comprising virtual objects overlaid upon and anchored to real-world objects), a virtual reality environment (comprising virtual objects and displays oriented in a fully-artificial digital environment), and/or an extended reality environment (comprising a combination of mixed and virtual reality elements). The mixed-reality environment, virtual reality environment, and/or extended reality environment may display interactive three-dimensional visualizations.

According to further embodiments, mixed-reality visualization system 120 and one or more mixed-reality devices 130 generate a visualization of, among other things, mixed-reality cube visualization 402 comprising clusters generated by segmentation data. Although mixed-reality cube visualization 402 is shown and described as a grouping of cubes displaying segmentation data, embodiments contemplate any suitable polyhedron or multi-dimensional object displaying any suitable supply chain data or other data types, according to particular needs.

According to embodiments, one or more mixed-reality devices 130 comprise one or more electronic devices that display mixed-reality visualizations for navigating and interacting with displayed mixed-reality visualizations. One or more mixed-reality devices 130 may comprise, for example, a mixed-reality headset, a head-mounted display, a smartphone, a tablet computer, a mobile device, a projector, or like devices. One or more mixed-reality devices 130 comprise one or more sensors 132, one or more processors 134, memory 136, display 138, and may include an input device, output device, and a fixed or removable computer-readable storage media. One or more sensors 132 may comprise an imaging sensor, such as, for example, a camera module, a LIDAR device, radar device, infrared light sensor, ambient light sensor, or other electronic sensor. According to one embodiment, one or more sensors 132 detect the head movement, the field of vision, and the gaze of a user of one or more mixed-reality devices 130. One or more processors 134 and associated memory 136 execute instructions and manipulate information according to the operation of mixed-reality visualization system 120 and any of the methods and workflows described herein. Display 138 of one or more mixed-reality devices 130 displays visual information, such as, for example, feedback, analysis, data, images or graphics using mixed-reality visualizations. For example, display 138 of one or more mixed-reality devices 130 may superimpose graphics, colors, text, or other renderings of supply chain data over or in connection with a virtual visualization of mixed-reality cube visualization 402. Using one or more mixed-reality devices 130, a user may interact with the rendered visualizations using speech, eye movement, and spoken instructions to interact with and modify supply chain network 100. Mixed-reality visualization system 120, in connection with one or more mixed-reality devices 130, comprises a system to visualize segmentation boundaries, outliers, and clusters. One or more mixed-reality devices 130 may include fixed or removable computer-readable storage media, including a non-transitory computer readable medium, magnetic computer disks, flash drives, CD-ROM, in-memory device or other suitable media to receive output from and provide input to mixed-reality visualization system 120.

Inventory system 140 comprises server 142 and database 144. Database 144 of inventory system 140 is configured to receive and transmit inventory data, including item identifiers, pricing data, attribute data, inventory levels, and other like data about one or more items at one or more locations in supply chain network 100. Each item may be represented in supply chain network 100 by an identifier, including, for example, Stock-Keeping Unit (SKU), Universal Product Code (UPC), serial number, barcode, tag, RFID, or like objects that encode identifying information. Database 144 stores and retrieves inventory data from database 144 or from one or more locations in supply chain network 100. Inventory system 140 may send current inventory levels to segmentation planner 110 and, in response, segmentation planner 110 may determine and indicate whether the current inventory levels will be sufficient to meet one or more planned assortments.

Transportation network 150 comprises server 152 and database 154. According to embodiments, transportation network 150 directs one or more transportation vehicles 156 to ship one or more items between one or more supply chain entities 160, based, at least in part, on a sales forecast or an assortment determined by segmentation planner 110, the number of items currently in stock at one or more stocking locations of one or more supply chain entities 160, the number of items currently in transit in transportation network 150 and/or one or more other factors described herein. One or more transportation vehicles 156 comprise, for example, any number of trucks, cars, vans, boats, airplanes, unmanned aerial vehicles (UAVs), cranes, robotic machinery, or the like. One or more transportation vehicles 156 may comprise radio, satellite, or other communication that communicates location information (such as, for example, geographic coordinates, distance from a location, global positioning satellite (GPS) information, or the like) with segmentation planner 110, mixed-reality visualization system 120, inventory system 140, transportation network 150, and/or one or more supply chain entities 160 to identify the location of transportation vehicle 156 and the location of any inventory or shipment located on transportation vehicle 156.

As shown in FIG. 1, supply chain network 100 comprising segmentation planner 110, mixed-reality visualization system 120, one or more mixed-reality devices 130, inventory system 140, transportation network 150, and one or more supply chain entities 160 may operate on one or more computers 170 that are integral to or separate from the hardware and/or software that support segmentation planner 110, mixed-reality visualization system 120, one or more mixed-reality devices 130, inventory system 140, transportation network 150, and one or more supply chain entities 160. One or more computers 170 may include any suitable input device 172, such as a keypad, mouse, touch screen, microphone, or other device to input information. Output device 174 may convey information associated with the operation of supply chain network 100, including digital or analog data, visual information, or audio information. One or more computers 170 may include fixed or removable computer-readable storage media 176, including a non-transitory computers readable medium, magnetic computer disks, flash drives, CD-ROM, in-memory device or other suitable media to receive output from and provide input to supply chain network 100. One or more computers 170 may include one or more processors and associated memory to execute instructions and manipulate information according to the operation of supply chain network 100 and any of the methods described herein. In addition, or as an alternative, embodiments contemplate executing the instructions on one or more computers 170 that cause one or more computers 170 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods and workflows described herein.

Segmentation planner 110, mixed-reality visualization system 120, one or more mixed-reality devices 130, inventory system 140, transportation network 150, and one or more supply chain entities 160 may each operate on one or more separate computers 170, a network of one or more separate or collective computers 170, or may operate on one or more shared computers 170. In addition, supply chain network 100 may comprise a cloud-based computing system having processing and storage devices at one or more locations, local to, or remote from segmentation planner 110, mixed-reality visualization system 120, one or more mixed-reality devices 130, inventory system 140, transportation network 150, and one or more supply chain entities 160. In addition, each of one or more computers 170 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with segmentation planner 110, mixed-reality visualization system 120, one or more mixed-reality devices 130, inventory system 140, transportation network 150, and one or more supply chain entities 160.

These one or more users may include, for example, a "manager" or a "planner" handling configuration and operation of segmentation planner 110 and mixed-reality visualization system 120 and/or one or more related tasks within supply chain network 100. In addition, or as an alternative, these one or more users within supply chain network 100 may include, for example, one or more computers 170 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery 165 (including producing items), and/or one or more related tasks within supply chain network 100.

One or more supply chain entities 160 represents one or more retailers 168, suppliers 162, manufacturers 164, and distribution centers 166 in one or more supply chain networks 100, which may be included in one or more enterprises. One or more retailers 168 may be any suitable entity that obtains one or more products to sell to one or more customers. In addition to the clothing retailer disclosed above, one or more retailers 168 may comprise a grocery retailer, a furniture retailer, and a big-box store, or any suitable retailer, according to particular needs. One or more retailers 168 may comprise any online or brick and mortar location, including locations with shelving systems 169. Shelving systems 169 may comprise, for example, various racks, fixtures, brackets, notches, grooves, slots, or other attachment devices for fixing shelves or display locations in various configurations. These configurations may comprise shelving and display locations with adjustable lengths, heights, and other arrangements, which may be adjusted by an employee of one or more retailers 168 based on computer-generated instructions or automatically by machinery to place products in a desired location in response to, or based at least in part on, a sales forecast, clusters or segments identified by segmentation planner 110, and/or visualizations, analysis, or insights provided by mixed-reality visualization system 120, the number of items currently in stock or projected to be in stock at one or more stocking location of one or more supply chain entities 160, the number of items currently in transit in transportation network 150, a forecasted demand, a supply chain disruption, a material or capacity reallocation, and/or one or more additional factors described herein.

One or more suppliers 162 may be any suitable entity that offers to sell or otherwise provides one or more components to one or more manufacturers 164. One or more suppliers 162 may, for example, receive a product from a first supply chain entity in supply chain network 100 and provide the product to another supply chain entity. One or more suppliers 162 may comprise automated distribution systems 163 that automatically transport products to one or more manufacturers 164. Manufacturer 164 may be any suitable entity that manufactures at least one product. Manufacturer 164 may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, such as a supplier, an item that needs further processing, or any other item. Manufacturer 164 may, for example, produce and sell a product to a supplier, another manufacturer, a distribution center, a retailer, a customer, or any other suitable person or an entity. Such manufacturers 164 may comprise automated robotic production machinery 165 that produce products in response to, or based at least in part on, a sales forecast, clusters or segments identified by segmentation planner 110, and/or visualizations, analysis, or insights provided by mixed-reality visualization system 120, the number of items currently in stock or projected to be in stock at one or more stocking location of one or more supply chain entities 160, the number of items currently in transit in transportation network 150, a forecasted demand, a supply chain disruption, a material or capacity reallocation, and/or one or more additional factors described herein.

One or more distribution centers 166 may be any suitable entity that offers to sell or otherwise distributes at least one product to one or more retailers 168 and/or customers. Distribution centers 166 may, for example, receive a product from a first supply chain entity in supply chain network 100 and store and transport the product for a second supply chain entity. Such distribution centers 166 may comprise automated warehousing systems 167 that automatically transport to one or more retailers 168 or customers and/or automatically remove an item from, or place an item into, inventory in response to, or based at least in part on, a sales forecast, clusters or segments identified by segmentation planner 110, and/or visualizations, analysis, or insights provided by mixed-reality visualization system 120, the number of items currently in stock or projected to be in stock at one or more stocking location of one or more supply chain entities 160, the number of items currently in transit in transportation network 150, a forecasted demand, a supply chain disruption, a material or capacity reallocation, and/or one or more additional factors described herein.

Although one or more retailers 168, suppliers 162, manufacturers 164, and distribution centers 166 are shown and described as separate and distinct entities, the same entity may simultaneously act as any one or more retailers 168, suppliers 162, manufacturers 164, and distribution centers 166. For example, one or more manufacturers 164 acting as a manufacturer could produce a product, and the same entity could act as a supplier to supply a product to another supply chain entity. Although one example of supply chain network 100 is shown and described, embodiments contemplate any configuration of supply chain network 100, without departing from the scope of the present disclosure.

Data received from supply chain entities 160 may be stored in supply chain database 161. In one embodiment supply chain database 161 stores supply chain data received from a manufacturing supply chain, such as, for example, data received from a demand planning system, inventory optimization system, supply planning system, order promising system, factory planning and sequencing system, and sales and operations planning system. In an embodiment where supply chain network 100 comprises a retail supply chain, supply chain database 161 stores data received from one or more retail supply chain planning and execution systems such as, for example, historical sales data, retail transaction data, store characteristic data, and data received from demand planning system, assortment optimization system, category management system, transportation management system, labor management system, and warehouse management system. Although particular planning and execution systems of particular types of supply chain network 100 are shown and described, embodiments contemplate supply chain database 161 storing data received from planning and execution systems for any type of supply chain network 100 and data received from one or more locations local to, or remote from, supply chain network 100, such as, for example, social media data, weather data, social trends, and the like.

Segmentation planner 110 may be coupled with network 180 using communication links 190a, which may be any wireline, wireless, or other link suitable to support data communications between segmentation planner 110 and network 180 during operation of supply chain network 100. Mixed-reality visualization system 120 may be coupled with network 180 using communication links 190b, which may be any wireline, wireless, or other link suitable to support data communications between mixed-reality visualization system 120 and network 180 during operation of supply chain network 100. In one embodiment, one or more mixed-reality devices 130 are coupled with network 180 using communication links 190c, which may be any wireline, wireless, or other link suitable to support data communications between one or more mixed-reality devices 130 and network 180 during operation of supply chain network 100. Inventory system 140 may be coupled with network 180 using communication links 190d, which may be any wireline, wireless, or other link suitable to support data communications between inventory system 140 and network 180 during operation of supply chain network 100. Transportation network 150 may be coupled with network 180 using communication links 190e, which may be any wireline, wireless, or other link suitable to support data communications between transportation network 150 and network 180 during operation of supply chain network 100. One or more supply chain entities 160 may be coupled with network 180 using communication links 190f, which may be any wireline, wireless, or other link suitable to support data communications between one or more supply chain entities 160 and network 180 during operation of supply chain network 100. One or more computers 170 may be coupled with network 180 using communication links 190g, which may be any wireline, wireless, or other link suitable to support data communications between one or more computers 170 and network 180 during operation of supply chain network 100.

Although communication links 190a-190g are shown as generally coupling segmentation planner 110, mixed-reality visualization system 120, one or more mixed-reality devices 130, inventory system 140, transportation network 150, one or more supply chain entities 160, and computer 170 to network 180, each of segmentation planner 110, mixed-reality visualization system 120, one or more mixed-reality devices 130, inventory system 140, transportation network 150, one or more supply chain entities 160, and one or more computers 170 may communicate directly with each other, according to particular needs.

In another embodiment, network 180 includes the Internet and any appropriate local area networks (LANs), metropolitan area networks (MANs), or wide area networks (WANs) coupling segmentation planner 110, mixed-reality visualization system 120, one or more mixed-reality devices 130, inventory system 140, transportation network 150, one or more supply chain entities 160, and one or more computers 170. For example, data may be maintained by locally or externally of segmentation planner 110, mixed-reality visualization system 120, one or more mixed-reality devices 130, inventory system 140, transportation network 150, one or more supply chain entities 160, and one or more computers 170 and made available to one or more associated users of segmentation planner 110, mixed-reality visualization system 120, one or more mixed-reality devices 130, inventory system 140, transportation network 150, one or more supply chain entities 160, and one or more computers 170 using network 180 or in any other appropriate manner. Those skilled in the art will recognize that the complete structure and operation of network 180 and other components within supply chain network 100 are not depicted or described. Embodiments may be employed in conjunction with known communications networks and other components.

The methods described herein may include one or more computers 170 receiving product data from automated machinery having at least one sensor and the product data corresponding to an item detected by the sensor. The received product data may include an image of the item, an identifier, as described above, product attributes, and/or other product data associated with the item. The method may further include automatic product and attribute recognition in response to transmitting the product data to mixed-reality visualization system 120 or one or more computers 170 looking up the received product data in database system associated with segmentation planner 110, mixed-reality visualization system 120, one or more mixed-reality devices 130, inventory system 140, and/or transportation network 150 to identify the item or its corresponding attributes.

Although examples are described below primarily in connection with supply chain network 100 solely for the sake of clarity, embodiments of the systems and methods contemplate generating segments for other business environments and with any number of participating customers, demographics, and/or other business entities, and in response to any number of features, intersections, products, and/or items.

Figure 2:
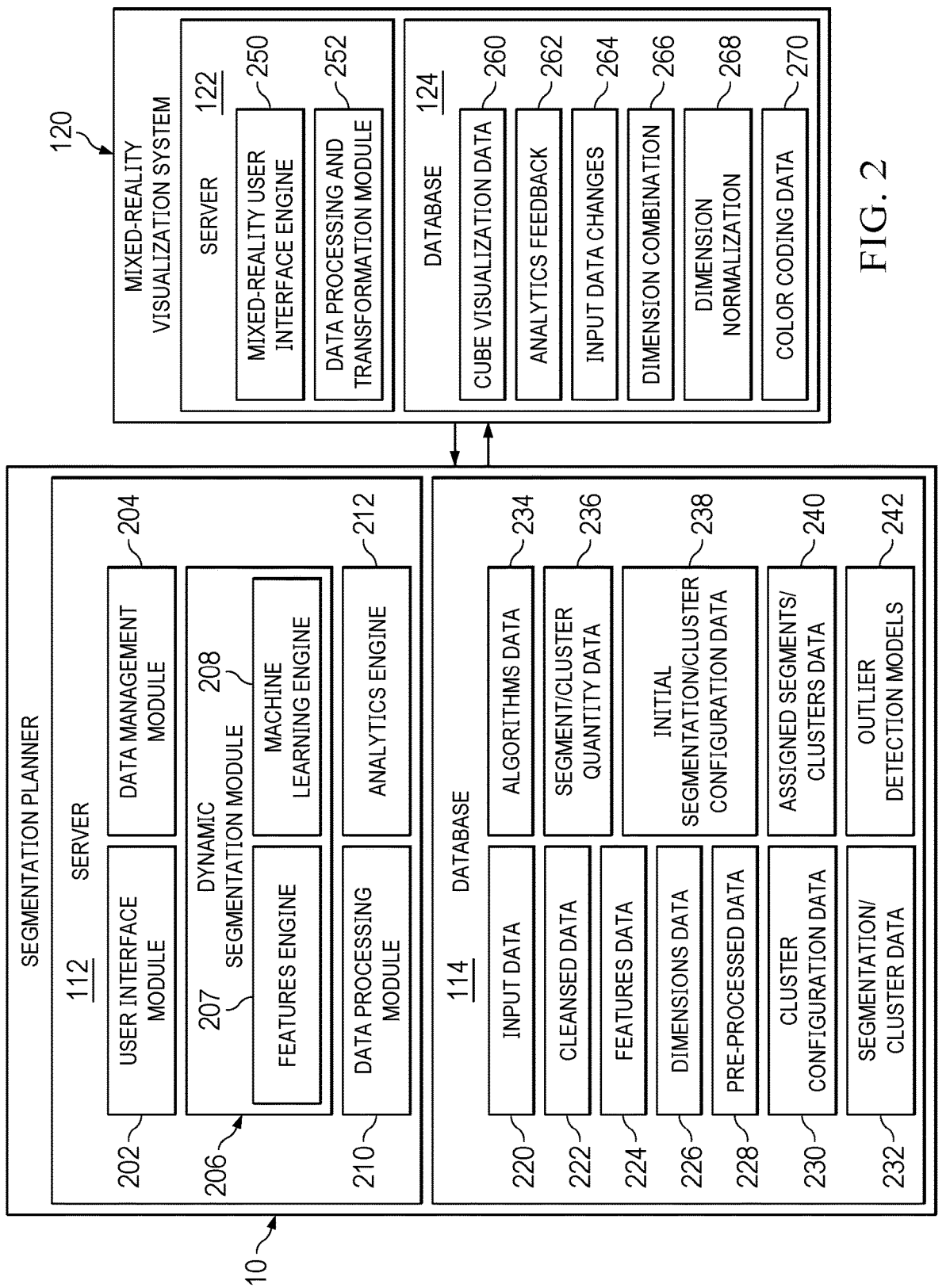
FIG. 2 illustrates a segmentation planner and a mixed-reality visualization system of FIG. 1 in greater detail in accordance with an embodiment.

FIG. 2 illustrates segmentation planner 110 and mixed-reality visualization system 120 of FIG. 1 in greater detail in accordance with an embodiment. As described above, segmentation planner 110 and mixed-reality visualization system 120 may comprise one or more computers 170 at one or more locations including associated input devices 172, output devices 174, non-transitory computer-readable storage media 176, processors, memory, or other components for receiving, processing, storing, and communicating information according to the operation of supply chain network 100. Additionally, segmentation planner 110 comprises server 112 and database 114. Although segmentation planner 110 is shown as comprising a single server 112 and a single database 114, embodiments contemplate any suitable number of computers 170, servers 112, or databases 114 internal to or externally coupled with segmentation planner 110. According to some embodiments, segmentation planner 110 may be located internal to one or more retailers 168 of one or more supply chain entities 160. In other embodiments, segmentation planner 110 may be located external to one or more retailers 168 of one or more supply chain entities 160 and may be located in, for example, a corporate retailer of the one or more retailers 168, according to particular needs.

Server 112 of segmentation planner 110 may comprise user interface module 202, data management module 204, dynamic segmentation module 206, data processing module 210, and analytics engine 212. Although server 112 is illustrated and described as comprising a single user interface module 202, data management module 204, dynamic segmentation module 206, data processing module 210, and analytics engine 212, embodiments contemplate any suitable number or combination of these located at one or more locations, local to, or remote from segmentation planner 110, such as on multiple servers 112 or computers 170 at any location in supply chain network 100.

According to embodiments, user interface module 202 receives and processes a user input, such as, for example, input received by input device 172 of one or more computers 170. One or more computers 170 may transmit input to segmentation planner 110 using one or more communication links 190a-190g. User interface module 202 may register the input to one or more other modules or engines of segmentation planner 110. In an embodiment, user interface module 202 generates and displays a user interface (UI), such as, for example, a graphical user interface (GUI), that displays one or more interactive visualizations of segmentations, clusters, features or attributes, intersections, and/or other data. User interface module 202 may generate one or more GUI displays. The one or more GUI displays may convey information, including supply chain plan data, segmentation data, and/or any other type of information about supply chain network 100, segmentation, and clusters. In addition, or as an alternative, embodiments of user interface module 202 assign policy parameters to one or more segments of the segmentation data in response to receiving input to one or more input devices 172.

Data management module 204 may access input data 220 stored in segmentation planner database 114, and may transform input data 220 to generate cleansed data 222.

Dynamic segmentation module 206 may discover features, detect outliers, perform multi-dimension segmentation on the pre-processed data 228, and compute feature importance to generate segments and clusters, which dynamic segmentation module 206 may store as segmentation/cluster data 232 in database 114.

In an embodiment, dynamic segmentation module 206 comprises features engine 207 and machine learning engine 208. Features engine 207 may access and analyze cleansed data 222 to locate one or more features and one or more dimensions then store the features in features data 224 and the dimensions in dimensions data 226.

Machine learning engine 208 may access pre-processed data 228, cluster configuration data 230, and algorithms data 234 to perform multi-dimension segmentation on pre-processed data 228 and compute feature importance to generate and visualize segments and clusters stored in segmentation/cluster data 232. According to embodiments, dynamic segmentation module 206 may select an algorithm based on whether the data stored in pre-processed data 228 is string-based or numerical-based, with some algorithms tailored for use with string-based data and other algorithms tailored for use with numerical-based data. In other embodiments, user interface module 202 may respond to input made to one or more input devices 172, and may directly select an algorithm from a selection of one or more algorithms stored in algorithms data 234. In response to generating new (or modified) clusters and segments, segmentation planner 110 initiates one or more supply chain processes, as described above, to alter the production, transportation, packaging, location, inventory, or the like, at one or more supply chain entities 160.

Machine learning engine 208 may access outlier detection models 242 to analyze segmentation/cluster data 232 using a selected outlier detection technique, detect outliers, and generate outlier data points. Although the activities of dynamic segmentation module 206 are illustrated and described as being performed by features engine 207 and machine learning engine 208, embodiments contemplate the activities may be performed solely by dynamic segmentation module 206.

Data processing module 210 may access the features data and may perform pre-processing actions on the features data to generate pre-processed data 228. Data processing module 210 may store pre-processed data 228 in database 114.

Analytics engine 212 may receive the clusters and segments stored in segmentation/cluster data 232, the number of dimensions stored in dimensions data 226, and feedback from one or more mixed reality devices 130, and based, at least in part, on the received clusters, segments, number of dimensions, and/or feedback, analytics engine 212 may generate mixed-reality cube visualization 402 that display different sets of features as a single cube, or as a combination of various cubes. By way of further explanation only and not by way of limitation, analytics engine 212 generates, for display on mixed-reality device 130, a set of n-dimensional cubes and provides for manipulation and movement of the n-dimensional cubes and other visualization elements for segmentation analysis, cluster boundary determination, and outlier detection and resolution.

By using ML-based or optimization-based approaches, segmentation planner 110 may generate segments in an n-dimensional space with less manual intervention by a user to adjust segmentation rules and using ABC classification. However, these advanced segmentation approaches generate results that are too mathematically complex, difficult to visualize and correlate, and difficult to meaningfully alter, correct, and improve. Insights from the ML multi-dimensional segmentation are not easily decipherable by functional experts and, especially, decision makers, and the insights are difficult (or impossible) to visualize and analyze when millions of records are utilized, such as, for example, in a retail environment. Mixed-reality device 130 provides analyzing segments and clusters generated in n-dimensional space, having n-dimensional features and n-dimensional segments, using accurate visualizations and exact data, to visualize the multi-dimensional segmentation output.

Database 114 of segmentation planner 110 may comprise one or more databases or other data storage arrangements at one or more locations, local to, or remote from, server 112. Database 114 may comprise, for example, input data 220, cleansed data 222, features data 224, dimensions data 226, pre-processed data 228, cluster configuration data 230, segmentation/cluster data 232, algorithms data 234, segment/cluster quantity data 236, initial segmentation/cluster configuration data 238, assigned segments/clusters data 240, and outlier detection models 242. Although database 114 is shown and described as comprising input data 220, cleansed data 222, features data 224, dimensions data 226, pre-processed data 228, cluster configuration data 230, segmentation/cluster data 232, algorithms data 234, segment/cluster quantity data 236, initial segmentation/cluster configuration data 238, assigned segments/clusters data 240, and outlier detection models 242, embodiments contemplate any suitable number or combination of these, located at one or more locations, local to, or remote from, segmentation planner 110 according to particular needs.

Input data 220 may comprise, for example, any data relating to the supply chain system. Input data 220 may comprise data relating to supply chain entities 160, previous supply chain plans, transactions and shipments between supply chain entities 160, or past sales, past demand, purchase data, promotions, events, or the like of one or more products and/or one or more supply chain entities 160. Input data 220 may comprise data regarding one or more features assigned to one or more products, items, or resources manufactured, transported, or sold throughout the supply chain system. Input data 220 may be stored at time intervals such as, for example, by the minute, hour, daily, weekly, monthly, quarterly, yearly, or any suitable time interval, including substantially in real time. Cleansed data 222 may comprise data in which data processing module 210 has determined segment intersections, converted input data 220 from one data storage format into another data storage format, and/or executed any other data modification or cleansing actions.

Features data 224 may comprise data in which features engine 207 has discovered one or more features, aggregated or dis-aggregated cleansed data 222, and/or executed any other feature discovery actions. Features are discovered by features engine 207 and stored in features data 224 of database 114. As disclosed above, segmentation features may comprise characteristics of data used to segment that data, such as, for example, geographic features (such as customer location, state, rural-urban, etc.), demographic features (such as customer gender, age, or job), behavioral features (such as products tailored towards impulse purchases), and psychological features (such as products designed to appeal to "green" consumers by reducing environmental impact on the planet). By way of example and not by way of limitation, features may include, for one or more products, unit cost, location time, item forecast volume, item historical quantity, coefficient of variability, cumulative demand, and/or any other attribute or features.

Dimensions data 226 may comprise a number of dimensions (i.e., n dimensions) used by segmentation planner 110 to generate mixed-reality cube visualizations 402. Pre-processed data 228 may comprise data that have been preprocessed by data processing module 210 to standardize features data 224 (such as, for example, by standardizing the granularity of features data 224 and all features stored in features data 224; standardizing units of measure or currency of features data 224 and all features stored in features data 224; and/or performing any other pre-processing actions to standardize features data 224).

Cluster configuration data 230 may comprise one or more pre-defined cluster configurations, such as, for example, a minimum and a maximum cluster. Segmentation/cluster data 232 may comprise data relating to one or more segments and clusters generated by dynamic segmentation module 206, as described in greater detail below. Algorithms data 234 may comprise data related to one or more algorithms accessed by dynamic segmentation module 206 to perform autonomous segmentation. Segment/cluster quantity data 236 may store the segment and cluster quantity selected by dynamic segmentation module 206 during the activities of segment analysis method 300, described in greater detail below. Initial segmentation/cluster configuration data 238 may comprise data related to one or more initial segment and cluster configurations, generated by dynamic segmentation module 206 during the activities of segment analysis method 300.

Assigned segments/clusters data 240 comprises data related to one or more assigned segments and clusters generated by dynamic segmentation module 206 during the activities of segment analysis method 300. According to embodiments, assigned segments/clusters data 240 may also comprise data relating to the relative importance of one or more features stored in assigned segments/clusters data 240. In an embodiment, dynamic segmentation module 206 accesses initial segmentation/cluster configuration data 238 and pre-processed data 228 and assigns segments and clusters from initial segmentation/cluster configuration data 238 to item and/or product intersections, as well as one or more features, stored in pre-processed data 228. According to embodiments, dynamic segmentation module 206 may use one or more of any algorithms or processes to compute the relative importance of one or more features stored in assigned segments/clusters data 240, including but not limited to a boundary analysis of how each feature participates in interacting with one or more segments. Dynamic segmentation module 206 computes a relative importance score for each of the one or more features stored in assigned segments/clusters data 240. Dynamic segmentation module 206 may drop one or more features associated with relative importance scores lower than a defined threshold. Dynamic segmentation module 206 accesses the assigned segments, clusters, features, and intersections stored in assigned segments/clusters data 240, and stores data associated with the assigned segments, features, and intersections in segmentation/cluster data 232.

Outlier detection models 242 may comprise one or more outlier detection methods, such as, for example, isolation forest, other ML-based methods, and any other suitable method, according to particular needs, used by segmentation planner 110 to identify outlier data points. As disclosed above, dynamic segmentation module 206 analyzes segmentation/cluster data 232 using the selected outlier detection technique to generate the outlier data points. A two-dimensional visualization of the outlier data points uses approximation to display the multi-dimensional outlier data points. Further, outlier detection techniques frequently use approximation to reduce more than one dimension into a single dimension on specific assumptions, solve using the assumption, before moving to the next data point, and analyzing the significance of the resulting dimensions.

By way of further explanation only and not by way of limitation, segmentation planner 110 receives input data 220 and processes input data 220 using dynamic segmentation module 206. As a result, segmentation planner 110 generates segmentation/cluster data 232 with different features. When segmentation planner 110 receives an indication to use a particular number of dimensions (i.e., n dimensions), segmentation planner 110 clusters the data with n different dimensions or features and generates dimensional mixed-reality cube visualizations 402, such as the illustrated n $C_3$ cubes of FIG. 4, below.

As discussed above, mixed-reality visualization system 120 comprises server 122 and database 124. Although mixed-reality visualization system 120 is shown as comprising a single server 122 and a single database 124, embodiments contemplate any number of servers 122 or databases internal to, or externally coupled with, mixed-reality visualization system 120, according to particular needs.

Server 122 of mixed-reality visualization system 120 comprises mixed-reality user interface engine 250 and data processing and transformation module 252. Although server 122 is illustrated and described as comprising a single mixed-reality user interface engine 250 and a single data processing and transformation module 252, embodiments contemplate any suitable number or combination of these located at one or more locations, local to, or remote from mixed-reality visualization system 120, such as on multiple servers 122 or computers 170 at any location in supply chain network 100.

Mixed-reality user interface engine 250 may render for display the n-dimensional mixed-reality cube visualization 402 generated by analytics engine 212. Mixed-reality user interface 404 may provide for the navigation and manipulation of mixed-reality cube visualization 402 by receiving physical, visual, and voice input from one or more mixed-reality devices 130.

According to embodiments, data processing and transformation module 252 modifies supply chain data, segmentation/cluster data 232, and any other displayed data, in response to receiving suitable input or instructions from one or more mixed-reality devices 130. According to one embodiment, data processing and transformation module 252 modifies displayed data points for cluster boundary analysis, outlier detection analysis, identifying insights to ML-based segmentation results, and other use cases, as described in further detail below.

Database 124 of mixed-reality visualization system 120 may comprise one or more databases or other data storage arrangements at one or more locations, local to, or remote from, server 122. Database 124 may comprise, for example, cube visualization data 260, analytics feedback 262, input data changes 264, dimension combination 266, dimension normalization 268, and color coding data 270. Although database 124 is shown and described as comprising cube visualization data 260, analytics feedback 262, input data changes 264, dimension combination 266, dimension normalization 268, and color coding data 270, embodiments contemplate any number or combination of data stored at one or more locations local to, or remote from, mixed-reality visualization system 120, such as on multiple servers 122 or computers 170 at any location in supply chain network 100.

According to embodiments, analytics engine 212 of segmentation planner 110 and mixed-reality user interface engine 250 of mixed-reality visualization system 120, alone, or in combination, receive segmentation/cluster data 232 from segmentation planner 110 and generate visualizations, analytics, and insights for segmented and clustered supply chain data by the mixed-reality cube visualization 402.

Cube visualization data 260 comprises the n-dimension cube representing the combination of all features used to generate segmentation/cluster data 232. Although cube visualization 402 is shown and described in connection with segmentation of features, embodiments of the cubes are used for various other use cases, such as, for example, outlier detection analysis, as described in further detail below.

Analytics feedback 262 comprises data generated by mixed-reality visualization system 120 to modify displayed analytics visualizations in response to and based, at least in part, on one or more user interactions with mixed-reality user interface 404 such as, for example, voice inputs 406, visual inputs 408, and physical inputs 410 and feedback.

Input data changes 264 comprises the updated changes to input data 220 based on modifications to the underlying data. For example, the master data may be updated every week, and when the segmentation relies on forecast data or shipment data, the underlying master data may be updated between instances of generating visualizations and analysis using mixed-reality visualization system 120. When input data 220 changes, mixed-reality visualization system 120 updates mixed-reality cube visualization 402.

Dimension combination 270 comprises the selected features of the data displayed by mixed-reality cube visualizations 402. A user may make a custom selection group of data across all the dimensions. Dimension normalization 272 comprises normalizing displayed dimensions with respect to the cubes of mixed-reality cube visualizations 402. Color coding data 274 comprises the assignment of the same color coding (i.e. same shading, hue, symbol, character, text, or the like) to each data point associated with a particular cluster.

FIG. 3 illustrates an exemplary segment/cluster generation, visualization, and analysis method 300, in accordance with an embodiment. In an embodiment, segmentation planner 110 generates and visualizes segments and clusters, segmentation planner 110 detects outliers, segmentation planner 110 and mixed-reality visualization system 120, alone, or in combination, generate mixed-reality cube visualizations 402 for display on mixed-reality device 130, and mixed-reality visualization system 120 provides for manipulation and movement of visualization elements. The following segment/cluster generation, visualization, and analysis method 300 proceeds by one or more actions, which although described in a particular order may be performed in one or more permutations, combinations, orders, or repetitions, according to particular needs.

At activity 302 of segment/cluster generation, visualization, and analysis method 300, data management module 204 manages input data 220 and generates cleansed data 222. Data management module 204 accesses input data 220 stored in segmentation planner database 114. In an embodiment, data management module 204 determines segment intersections based on input data 220. By way of further explanation only and not by way of limitation, an example of input data 220 is given for three items (Item A, Item B and Item C), each of which is stored in various quantities of stock at three locations (Supplier X, Supplier Y, and Supplier Z). Data management module 204 may select granular intersections, in which the exact quantity of each item at each location is imported into cleansed data 222. Continuing with the previous example, data management module 204 may select an exact quantity of each of Item A, Item B and Item C at each of Supplier X, Supplier Y, and Supplier Z to be imported into cleansed data 222. In other embodiments, data management module 204 may select broader, less granular intersections. For the example Item A, Item B, and Item C, data management module 204 may select only the total quantities of Item A, Item B and Item C across all three Supplier X, Supplier Y, and Supplier Z are imported into cleansed data 222. This example is provided for illustrative purposes only, and embodiments contemplate data management module 204 selecting any form of segment intersections while generating cleansed data 222, using any intersection selection criteria, according to particular needs. In some embodiments, user interface module 202 responds to input to one or more input devices 172, and selects one or more segment intersections directly.

Data management module 204 may transform input data 220 to generate cleansed data 222. Data transformation may comprise converting input data 220 from one data storage format into another data storage format; copying one or more pre-discovered features stored in input data 220 into cleansed data 222; removing one or more pre-discovered features stored in input data 220; and/or any other data modification or cleansing actions. Having generated cleansed data 222, data management module 204 stores cleansed data 222 in segmentation planner database 114.

At activity 304 of segment/cluster generation, visualization, and analysis method 300, features engine 207 discovers features. Features engine 207 accesses cleansed data 222 and aggregates or dis-aggregates cleansed data 222 based on one or more segment intersections to identify features and dimensions. Features engine 207 may aggregate or dis-aggregate cleansed data 222 based on, for example, a focus on one or more products or resources manufactured, transported, or sold throughout supply chain network 100; one or more locations or geographic regions throughout supply chain network 100; or based on any other focus or intersection, according to particular needs. Features engine 207 may aggregate or dis-aggregate cleansed data 222 using one or more direct input features (such as, for example, price), and/or one or more derived features that features engine 207 may compute based on one or more other features stored in cleansed data 222. In addition, or as an alternative, features and dimensions may be user-selected or input directly by the user interface and input devices 172.

At activity 306 of segment/cluster generation, visualization, and analysis method 300, data processing module 210 pre-processes features data 224 to generate pre-processed data 228. According to embodiments, data processing module 210 may access features data 224 and pre-process features data 224 in order to standardize features data 224 (such as, for example, by standardizing the granularity of features data 224 and all features stored in features data 224; standardizing units of measure or currency of features data 224 and all features stored in features data 224; and/or performing any other pre-processing actions to standardize features data 224). In an embodiment, data processing module 210 reduces the dimensions of one or more features stored in features data 224 to emphasize one or more other features. Data processing module 210 may perform data interpretation on features data 224 to emphasize one or more numerical features, and/or one or more string features, in pre-processed data 228. Having generated pre-processed data 228, data processing module 210 stores pre-processed data 228 in database 114.

At activity 308 of segment/cluster generation, visualization, and analysis method 300, machine learning engine 208 performs multi-dimension segmentation on pre-processed data 228 and computes feature importance to generate segments and clusters. In an embodiment, machine learning engine 208 accesses pre-processed data 228, cluster configuration data 230, and algorithms data 234 and performs segment analysis to generate segments and clusters. Having generated one or more segments and one or more clusters, dynamic segmentation module 206 stores the one or more segments and one or more clusters in segmentation/cluster data 232.

In an embodiment, prior to performing multi-dimension segmentation, machine learning engine 208 may receive a specified segment and cluster quantity (such as, for example, ten, twenty, fifty, or any other number) from user interface module 202 that is then stored in segment/cluster quantity data 236. In other embodiments, machine learning engine 208 performs autonomous multi-dimensional segmentation and computes a segment and cluster quantity autonomously using an artificial intelligence (AI) or machine learning (ML) algorithm stored in algorithms data 234, and stores the segment and cluster quantity in segment/cluster quantity data 236. Machine learning engine 208 may generate an initial segmentation/cluster configuration using the segment and cluster quantity stored in segment/cluster quantity data 236, then may store the initial segmentation/cluster configuration in initial segmentation/cluster configuration data 238.

Machine learning engine 208 may access the segment and cluster quantity stored in segment/cluster quantity data 236 and the initial segmentation/cluster configuration stored in initial segmentation/cluster configuration data 238 to generate one of more GUI displays visualizing the segment and cluster quantity and the initial segmentation/cluster configuration. Machine learning engine 208 may access initial segmentation/cluster configuration data 238 and pre-processed data 228 to assign segments and clusters from initial segmentation/cluster configuration data 238 to item and/or product intersections, as well as one or more features, stored in pre-processed data 228, then may store the assigned segments and clusters in assigned segments/clusters data 240.

Machine learning engine 208 may access algorithms data 234 to compute a relative importance of one or more features stored in assigned segments/clusters data 240, including but not limited to a boundary analysis of how each feature participates in interacting with one or more segments or clusters, then may assign a relative importance score for each of the one or more features and store the relative importance scores in assigned segments/clusters data 240. Machine learning engine 208 may remove one or more features when an associated relative importance score is below a defined threshold or in response to input from user interface module 202. Machine learning engine 208 may access assigned segments and clusters, features, and intersections stored in assigned segments/clusters data 240, and may store data associated with the assigned segments and clusters, features, and intersections in segmentation/cluster data 232.

At activity 310 of segment/cluster generation, visualization, and analysis method 300, user interface module 202 visualizes segment output and clusters. User interface module 202 accesses segmentation/cluster data 232 and generates one or more GUI displays, suitable for output on, for example, one or more output devices 174, to visualize the segment output.

At activity 312 of segment/cluster generation, visualization, and analysis method 300, user interface module 202 assigns policy parameters to segmentation/cluster data 232. In an embodiment, user interface module 202 responds to input from, for example, one or more input devices 172, and assigns one or more policy parameters to one or more segments stored in segmentation/cluster data 232. By way of example and not by way of limitation, policy parameters may comprise assigning service levels of 90%, 95%, 99%, or any other level to one or more segments.

At activity 314 of segment/cluster generation, visualization, and analysis method 300, machine learning engine 208 accesses outlier detection models 242 and analyzes segmentation/cluster data 232 using a selected outlier detection technique to detect outliers and generate outlier data points.

At activity 316 of segment/cluster generation, visualization, and analysis method 300, analytics engine 212 receives the clusters and segments stored in segmentation/cluster data 232, the number of dimensions stored in dimensions data 226, and feedback from one or more mixed reality devices 130, and based, at least in part, on the received clusters, segments, number of dimensions, and/or feedback, analytics engine 212 generates mixed-reality cube visualizations 402 stored as cube visualization data 260 in database 124.

At activity 318 of segment/cluster generation, visualization, and analysis method 300, mixed-reality user interface engine 250 accesses cube visualization data 260 and renders for display, on mixed-reality device 130, mixed-reality cube visualizations 402 generated by analytics engine 212.

At activity 320 of segment/cluster generation, visualization, and analysis method 300, data processing and transformation module 252 determines whether to proceed to activity 322 and modify displayed data in response to receiving suitable input or instructions from one or more mixed-reality devices 130, or to proceed to activity 324 and determine whether to proceed to activity 326 or terminate segment/cluster generation, visualization, and analysis method 300. Data processing and transformation module 252 may respond to input from one or more mixed-reality devices 130, including but not limited to input to mixed-reality user interface 404 detected by one or more mixed-reality devices 130, to determine whether to proceed to activity 322 or activity 324 of segment/cluster generation, visualization, and analysis method 300.

At activity 322 of segment/cluster generation, visualization, and analysis method 300, data processing and transformation module 252 modifies supply chain data, segmentation/cluster data 232, and any other displayed data, in response to receiving suitable input or instructions from one or more mixed-reality devices 130, including but not limited to one or more user interactions with mixed-reality user interface 404 such as, for example, voice inputs 406, visual inputs 408, and physical inputs 410 and feedback. By way of example and not by way of limitation, data processing and transformation module 252 may adjust the percentage of cluster points (closest to centroid), adjust the percentage of transparency, and adjust the normalized Euclidian distance from the centroid.

At activity 324 of segment/cluster generation, visualization, and analysis method 300, data processing and transformation module 252 determines whether to proceed to activity 326 and update multi-dimension segmentation, or terminate segment/cluster generation, visualization, and analysis method 300. Data processing and transformation module 252 may respond to input from one or more mixed-reality devices 130, including but not limited to input to mixed-reality user interface 404 detected by one or more mixed-reality devices 130, to determine whether to proceed to activity 326 or terminate segment/cluster generation, visualization, and analysis method 300.

At activity 326 of segment/cluster generation, visualization, and analysis method 300, machine learning engine 208 receives updated data from data processing and transformation module 252, updates multi-dimension segmentation, and generates updated segments and clusters, in response to data processing and transformation module 252 receiving suitable input or instructions from one or more mixed-reality devices 130, including but not limited to one or more user interactions with mixed-reality user interface 404 such as, for example, voice inputs 406, visual inputs 408, and physical inputs 410 and feedback. By way of example and not by way of limitation, data processing and transformation module 252 may send updated data to machine learning engine after receiving input or instructions from one or more mixed-reality devices 130 to remove outliers, increase the number of clusters, regenerate the clusters, or make changes in the master data. Data processing and transformation module 252 may store any changes to the master data as input data changes 264 in database 124.

When data processing and transformation module 252 receives no input or instructions from one or more mixed-reality devices 130, segmentation planner 110 and mixed-reality visualization system 120 terminate segment/cluster generation, visualization, and analysis method 300. By way of example only and not by way of limitation, an example of method 300 is shown by workflow 400 of FIG. 4.

Figure 4:
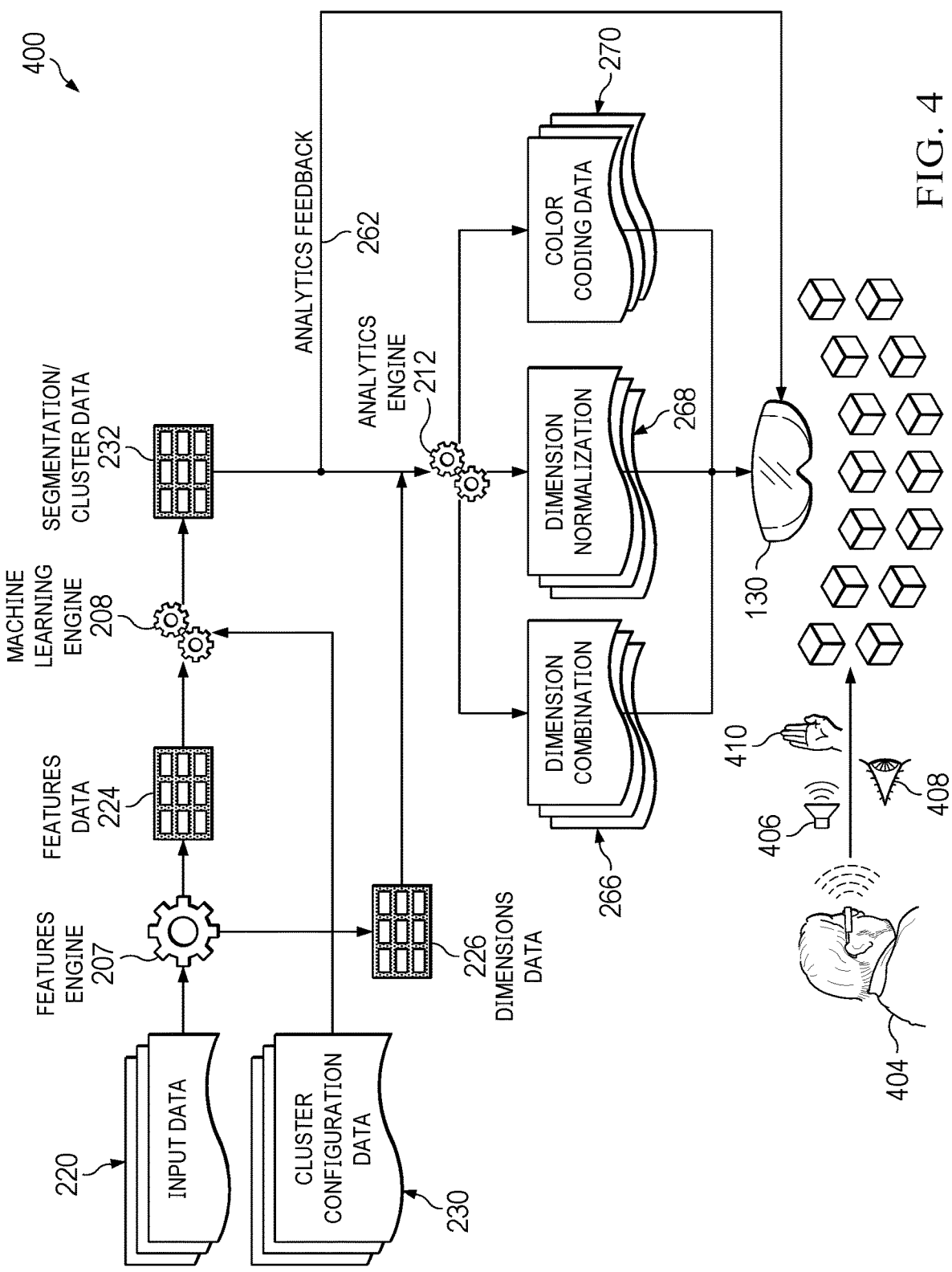
FIG. 4 illustrates a workflow of the segmentation planner and the mixed-reality visualization system, in accordance with an embodiment.

FIG. 4 illustrates workflow 400 of segmentation planner 110 and mixed-reality visualization system 120, in accordance with an embodiment. As disclosed above, segmentation planner 110 comprises features engine 207, which utilizes feature engineering to derive the segments, machine learning engine 208, which generates the segmentation output and clusters, and analytics engine 212. Analytics engine 212 receives the segmentation output and clusters, the number of dimensions, and the feedback from the visualization elements, and based, at least in part, on the received clusters, segmentation output, number of dimensions, and/or feedback, analytics engine 212 of segmentation planner 110 and mixed-reality user interface engine 250 of mixed-reality visualization system 120, alone, or in combination, generate mixed-reality cube visualizations 402 that display different sets of features as a single cube, or as a combination of various cubes. By way of further explanation only and not by way of limitation, analytics engine 212 of segmentation planner 110 and mixed-reality user interface engine 250 of mixed-reality visualization system 120, alone, or in combination, generate, for display on mixed-reality device 130, a set of n-dimensional cubes and mixed-reality visualization system 120 provides for manipulation and movement of the n-dimensional cubes and other visualization elements.

According to embodiments, mixed-reality device 130 provides for user interactions with displayed mixed-reality visualizations. One or more mixed-reality devices 130 comprises sensors 132, processors 134, memory 136, and display 138, as described above. According to one embodiment, one or more mixed-reality devices 130 comprise sensors comprising a gaze tracking sensor, hand gesture sensor, and head orientation sensor. According to other embodiments, one or more mixed-reality devices 130 provides a spatial visualization of a mixed-reality cuboid visualization providing for viewing, hearing, and/or receiving haptics conveying supply chain data, segmentation data, analytics, feedback, and other data through a device such as a mixed-reality headset (for example, the MICROSOFT HOLO-LENS, META 2 or EPSON MOVERIO BT-200 mixed-reality headsets).

At a general level, mixed-reality device 130 generates a mixed-reality environment that provides the user the sense of touching, feeling, and manipulating the data being analyzed. According to embodiments, one or more mixed-reality devices 130 may receive one or more mixed-reality device user inputs for search, navigation, visualization, and action. Embodiments contemplate a mixed-reality headset that provides mixed-reality device user input by one or more of voice tracking, gaze tracking, hand gesture tracking, and incremental discovery (i.e. looking in a direction to discover related components). Additionally, one or more sensors 132 of one or more mixed-reality devices 130 may be located at one or more locations local to, or remote from, one or more mixed-reality devices 130, including, for example, one or more sensors 132 integrated into one or more mixed-reality devices 130 or one or more sensors 132 remotely located from, but communicatively coupled with, one or more mixed-reality devices 130. As stated above, one or more mixed-reality devices 130 may include one or more processors 134 and associated memory 136 to execute instructions and manipulate information according to the operation of mixed-reality visualization system 120 and any of the methods and workflows described herein.

Display 138 of one or more mixed-reality devices 130 may comprise for example, a projector, a monitor, an LCD panel, or any other suitable electronic display device. Embodiments contemplate one or more mixed-reality devices 130 having more than one display 138, including a first display configured to direct an image into a user's left eye (a left eye display) and a second display configured to direct an image into a user's right eye (a right eye display) to provide a mixed-reality visualization by, for example, displaying visual elements on a transparent or translucent medium directly in front of a user's eyes, so that the visual element appears within the visual field of the user. One or more mixed-reality devices 130 display visual elements overlaid on real-world scenes and located based, at least in part, on the calculated visual field of the user. According to embodiments, information may be projected, overlaid, superimposed, or displayed such that the rendered and displayed images, text, and graphics are fixed in a virtual three-dimensional space anchored with a point or object in the environment, in a virtual space, or an orientation of the user or of one or more mixed-reality devices 130. In addition, or as an alternative, display 138 may display a mixed-reality visualization on an opaque display by overlaying one or more visual elements over a visual feed from a camera, and altering the appearance and placement of the visual elements based, at least in part, on the movement of objects within the visual feed of the camera and/or one or more sensors 132. According to some embodiments, mixed-reality visualization system 120 renders for display a mixed-reality cube visualization 402, based, at least in part, on the field of view of display 138 of one or more mixed-reality devices 130. By using mixed-reality visualization system 120, the rendered data may be displayed on a practically infinite canvas, wherein mixed-reality user interface 404 provides for touching, feeling, and moving data. In addition, mixed-reality cube visualization 402 provides for displaying the outlier data points without assumptions or approximations. By removing assumptions and approximations from the visualization, mixed-reality visualization system 120 reduces erroneous data. In addition, mixed-reality cube visualization 402 provides for identifying insights for ML output of dynamic segmentation module 206. Mixed-reality visualization system 120 generates visualizations that provide justification for the ML output of segmentation planner 110, which is usually a black box model.

Various examples of workflows related to visualizations and analytics displayed by mixed-reality visualization system 120 will now be discussed in connection with the following FIGURES.

FIG. 5 illustrates workflow 500 for an exemplary mixed-reality visualization, in accordance with an embodiment. By way of further explanation only and not by way of limitation, segmentation planner 110 receives input data 220 and processes input data 220 using a dynamic segmentation module 206 or another segmentation method. As a result, segmentation planner 110 generates segmentation/cluster data 232 with different features. When segmentation planner 110 receives an indication to use a particular number of dimensions (i.e., n dimensions), segmentation planner 110 clusters the data with n different dimensions or features, and generates mixed-reality cube visualizations 402, such as the illustrated n $C_3$ cubes. The n $C_3$ cubes are a combination of all the features of the data points in the form of cubes stored, which segmentation planner 110 stores as cube visualization data 260 in database 124.

Each row in input data 220 is a data point. During segmentation, the set of features of the data is determined for input data 220, which are then used to segment the data points. Each row in segmentation/cluster data 232 is also a data point. The data points and the features of segmentation/cluster data 232 are used to generate the cubes. Embodiments contemplate selection of a custom group of data across any of the dimensions. Each data point in the same cluster is assigned the same shading or color according to color coding data 270. Also, as disclosed above, each dimension is normalized and associated data is stored in dimension normalization 268. If, on any side of a cube 502a-502c, the points of the same color are scattered, this provides the insight that the clustering is not good. Because numerous cubes are arranged in three-dimensional space, numerous cubes can be seen and many data points are analyzed at the same time.

As described in further detail below, mixed-reality device 130 displays the cubes using parallax so that the cubes appear to float in a three-dimensional space in front of the user. Mixed-reality device 130 receives an input from the user indicating a touch of one of the cubes, the visualization may update display of the cubes to differentiate the selection of the data point from the cube, and, on top of the selection, the impact of the selection. In response to selection of a data point from mixed-reality cube visualization 402, the visualization displays how the data point is placed with respect to the other dimensions.

In addition, or as an alternative, mixed-reality device user input may select a list of data points from one side of a cube, and, in response, mixed-reality device 130 updates display 138. However, even though more than one data point was selected, there is a chance that the selection is converged to a centroid of the other sets of cubes. With that, mixed-reality device 130 eliminates the group selection of the data points from one space, and picking one data point from the other side of the cube, which will drive all the data points from the other cubes of interest to the user.

Although described in connection with the segmentation of features, the cubes may be used for other suitable use cases, according to particular needs. As described in further detail below, mixed-reality visualization system 120 provides for outlier detection analysis, which provides for manipulating a newly-generated set of clusters using mixed-reality cube visualization 402, moving the data points between segments or clusters, and visually determining the impact of the movement.

Figure 6:
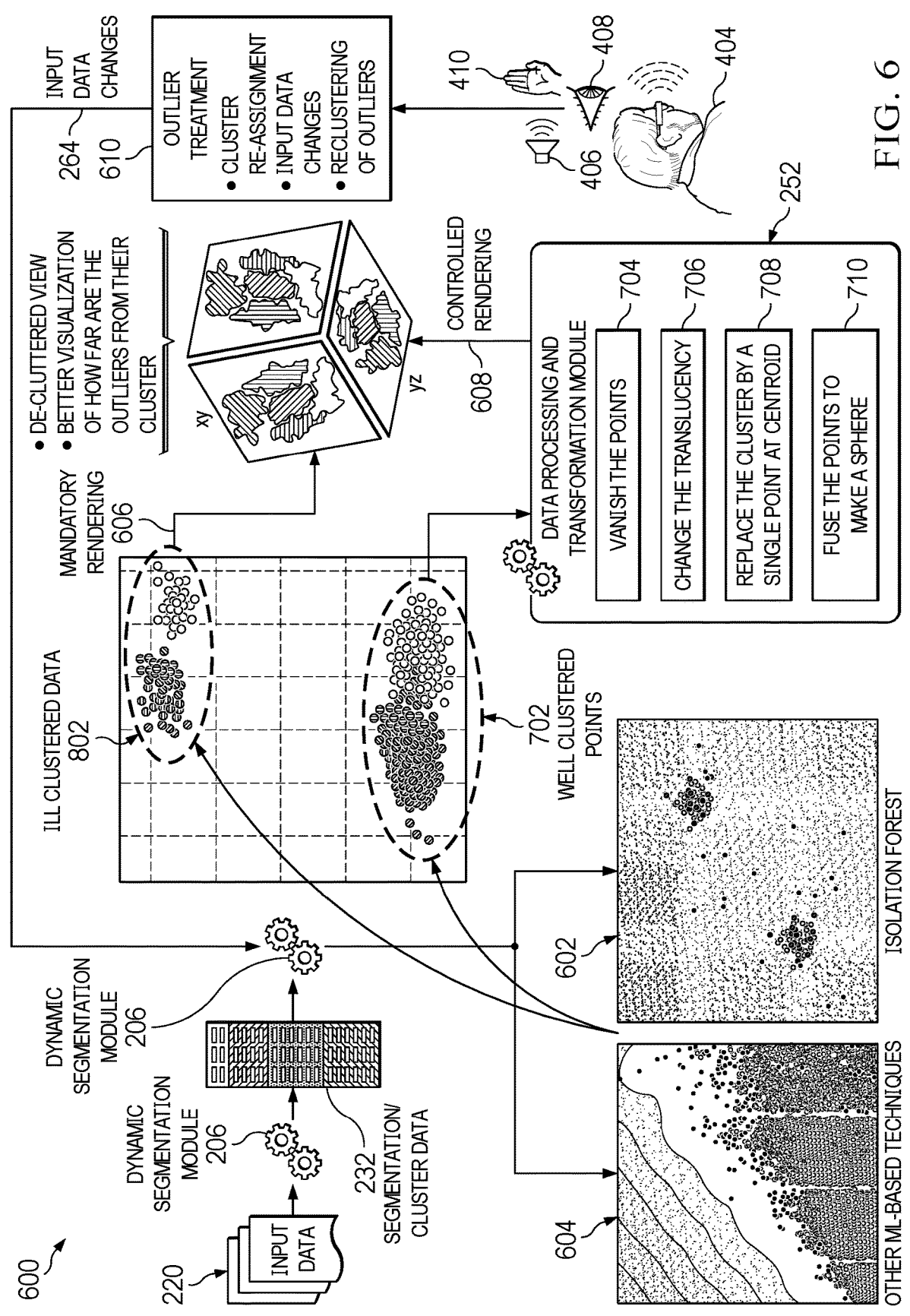
FIG. 6 illustrates a workflow for exemplary outlier detection and analysis, in accordance with an embodiment.

FIG. 6 illustrates workflow 600 for exemplary outlier detection and analysis, in accordance with an embodiment. As shown above, dynamic segmentation module 206 identifies outlier data points using one or more outlier detection techniques, such as, for example, isolation forest 602, other ML-based techniques 604, or other suitable methods, as disclosed above. By way of example only and not by way of limitation, mixed-reality visualization system 120 displays mandatory rendering 606 or, in response to receiving suitable input or instructions from one or more mixed-reality devices 130, displays controlled rendering 608, described further in FIG. 7. Mixed-reality visualization system 120 improves outlier detection and analysis using a hybrid approach that integrates mathematical, manual, and functional intelligence for better segmentation. By way of further explanation only and not by way of limitation, mixed-reality visualization system 120 provides for, in response to selecting the data points of a segment, displaying the impact of the selected data point from the other side of the cubes.

For example, a data point may appear to be an outlier from one side of a cube, but appear not to be an outlier from another side of the cube. By referring to sides of other cubes, the user may determine whether the data point is an outlier. However, detecting outliers does not require evaluating each data point, one-by-one. Instead, the user may select a group of items or group of data points in a particular space, and replace the selected data points with a single centroid. Mixed-reality device 130 provides for shifting between the multiple data points and the centroid, to check whether a data point is an outlier by referring to the other cubes. The greater the quantity of cubes where the data point tends to be an outlier, the higher the probability that the candidate outlier point is an actual outlier. If the analysis indicates that a significant feature is driving the segmentation where the data point is not an outlier, then it may also be concluded that the data point is an outlier.

When one or more data points are determined to be noise, mixed-reality visualization system 120 provides for smart rendering to vanish the data points or adjust the translucency of the data points. In addition, or as an alternative, mixed-reality visualization system 120 performs outlier treatment actions 610, including, for example, by fusing data points, described further in FIG. 8 and FIG. 9. By way of further explanation only and not by way of limitation, when a group of points are identified as potential outliers, mixed-reality visualization system 120 may fuse the data points together into a separate segment. Because these are all the outliers, fusing the data points into a separate cluster provides for visual separation from the non-outlier data, and provides for adjusting the policy parameter assignment based on the newly created segment.

Figure 7:
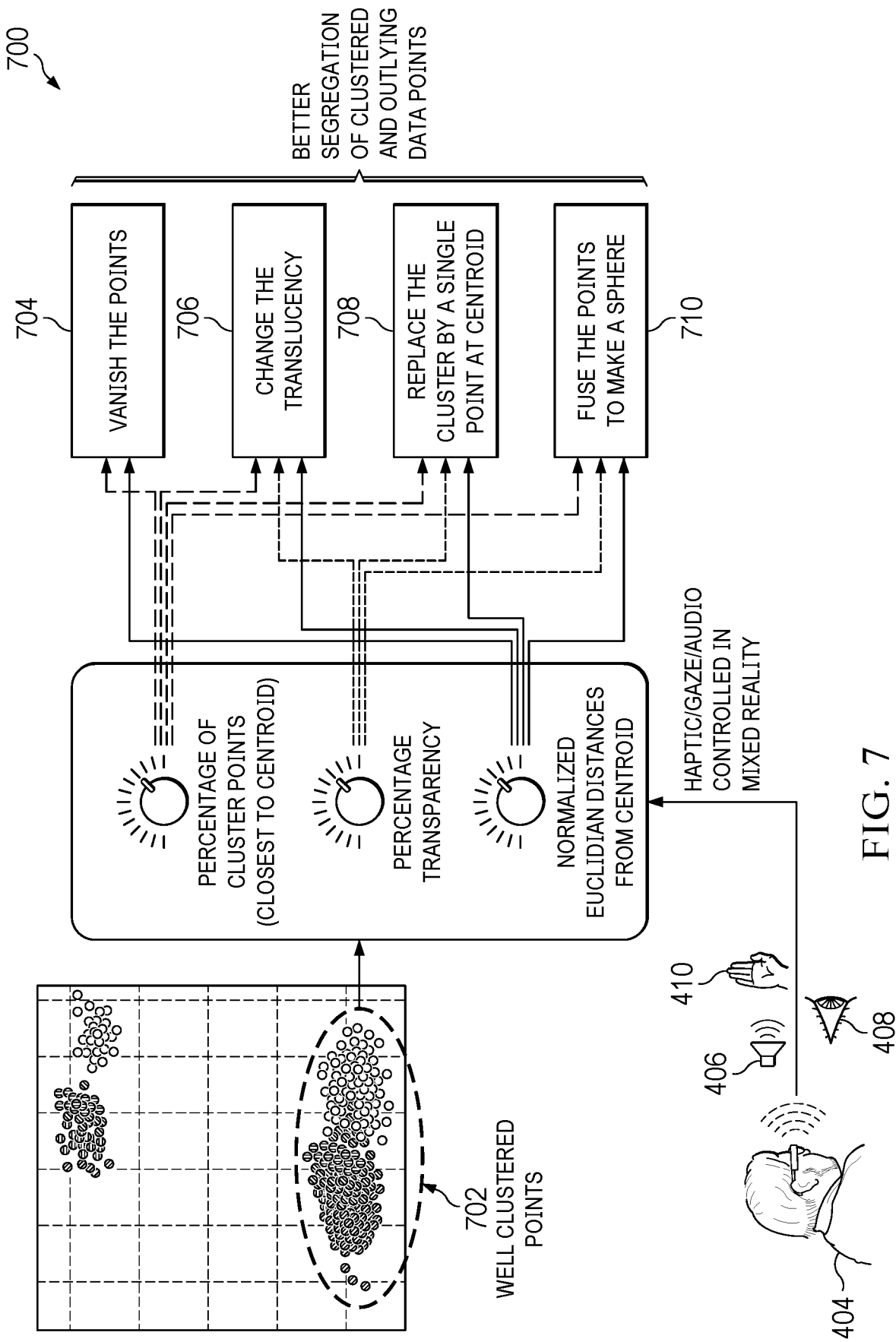
FIG. 7 illustrates a workflow for an exemplary controlled rendering of well-clustered points, in accordance with an embodiment.

FIG. 7 illustrates workflow 700 for an exemplary controlled rendering 608 of well-clustered points 702, in accordance with an embodiment. As disclosed above, mixed-reality visualization system 120 provides for one or more smart rendering techniques. To generate better segregation of clustered and outlying data points, mixed-reality visualization system 120 provides for controlled rendering 608 (using the smart rendering techniques) of well-clustered points 702 to adjust the percentage of cluster points (closest to centroid), adjust the percentage of transparency, and adjust the normalized Euclidian distance from the centroid. By way of example only and not by way of limitation, mixed-reality visualization system 120 provides for controlled rendering 608 by vanishing data points, changing translucency, replacing clusters by a single point at centroid, and fusing the points to make a sphere.

Mixed-reality device 130 provides first rendering technique 704 which vanishes all data points which are closer to a boundary. By vanishing particular data points, the number of data points to handle during outlier analysis is significantly less because the points to consider as potential outliers will be visible, while other data points which are not considered, will be vanished.

Embodiments of mixed-reality device 130 further provide second rendering technique 706 for adjusting the transparency of data points, instead of vanishing the data points. Using the example of outlier analysis, mixed-reality device user input may set the transparency of some data points which are less significant as a lower transparency than potential outliers which have a higher significance or that require further investigation or analysis.

Third rendering technique 708 of mixed-reality device 130 comprises replacing a cluster by a single point at the centroid. This technique is a significant improvement over previous visualization techniques. For example, when visualizing or analyzing data points from one side of a dimension or one side of an axis, the data points may all converge into one centroid. These situations occur when handling large data sets. Instead of handling each of the data points from the plane's perspective, mixed-reality user interface 404 provides for manipulating the centroid, as a representative of all the other data points from the side of the plane.

Fourth rendering technique 710 of mixed-reality device 130 comprises fusing a set of data points together, such as, for example, as a sphere. By way of example only and not by way of limitation, the fusing technique provides for creating a first cluster or segment from data points near the centroid and a second cluster or segment from points on the boundary 902. Examples of fourth rendering technique 710 are described in further detail below in connection with examples of segmentation visualizations.

Figure 8:
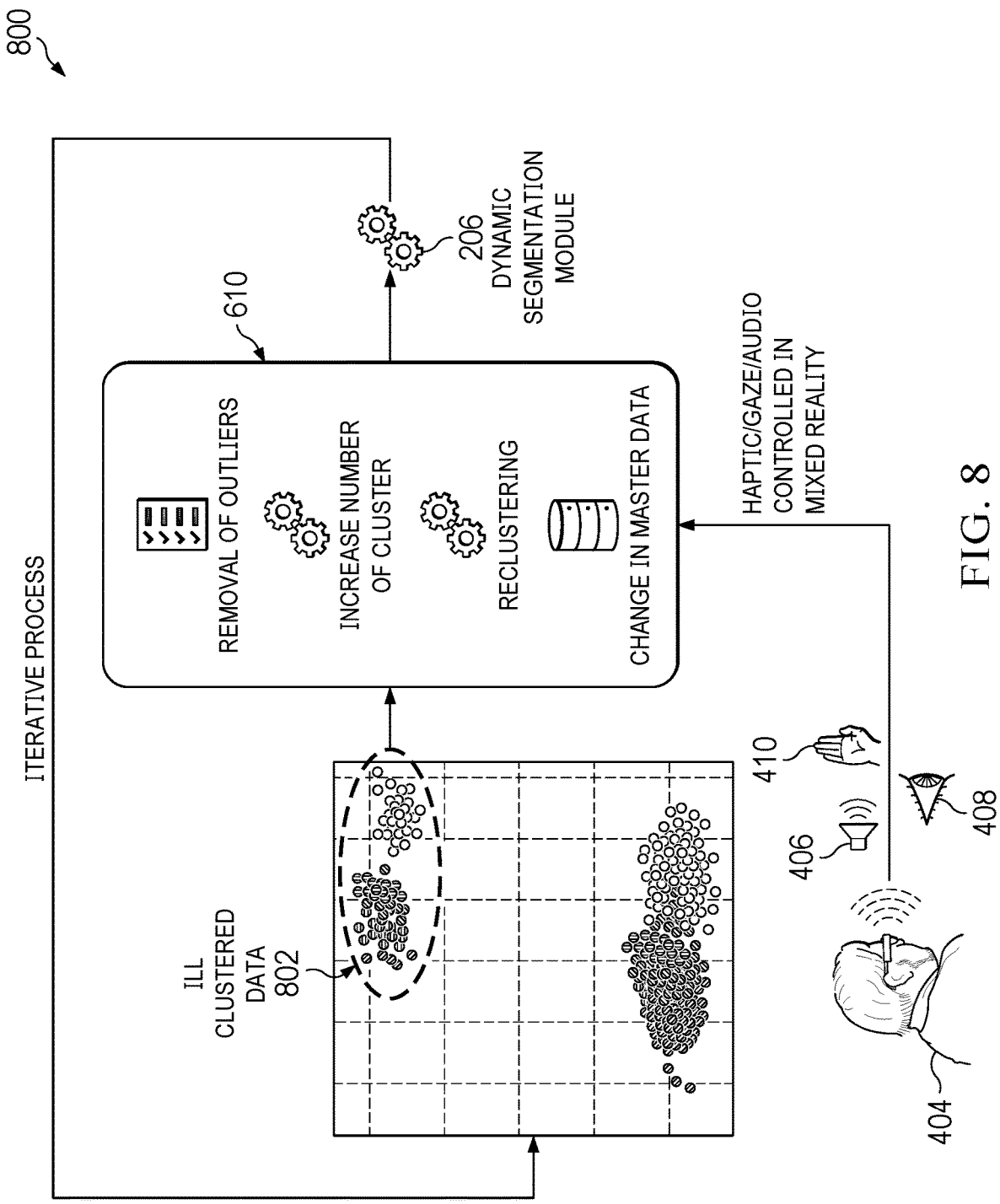
FIG. 8 illustrates a workflow for outlier handling, in accordance with an embodiment.

FIG. 8 illustrates workflow 800 for outlier handling, in accordance with an embodiment. Outlier handling comprises an iterative process to update the segments and clusters using outlier treatment actions 610 including removing outliers, increasing the number of clusters, regenerating the clusters (reclustering), and making changes in the master data. When calculating the optimal number of segments (such as, for example, by the centroid approach, the Silhouette coefficient technique, and the like), segmentation planner 110 does not provide a reason for the optimal number of segments. Accordingly, one or more business planners may analyze the resulting segments using business-based insight and rules which alter the recommendation from the optimization or ML-based segmentation. The business planners may use the recommendation as a basis and then analyze the data points of ill clustered data 802, identify outliers, and manipulate the recommended segments to generate an improved clustering of the data points. As disclosed above, mixed-reality visualization system 120 improves outlier detection and analysis using a hybrid approach that integrates mathematical, manual, and functional intelligence for better segmentation. For example, mixed-reality visualization system 120 displays visualization insights, which may then be used to rerun the ML multi-dimensional segmentation. Mixed-reality visualization system 120 may continue to iteratively generate mixed-reality visualizations and analytics comprising one or more insights. Segmentation planner 110 may be rerun with modifications based on the identified insight to provide better segmentation. When input data 220 changes, mixed-reality visualization system 120 stores the changes in input data changes 264 and updates mixed-reality cube visualizations 402, which provides insight into how outliers are handled given the change in input data 220.

By way of a further explanation only and not by way of limitation, an example cluster or segment is described wherein 60% of the data cannot move, while the remaining 40% can move across segments. When solving a business problem that requires analyzing the 60% of data, the business planner may consider only the boundary data points, and move the boundaries into a separate cluster. In addition, or as an alternative, the business planner may move the data points around the centroid and set these data points as a separate cluster.

Figure 9:
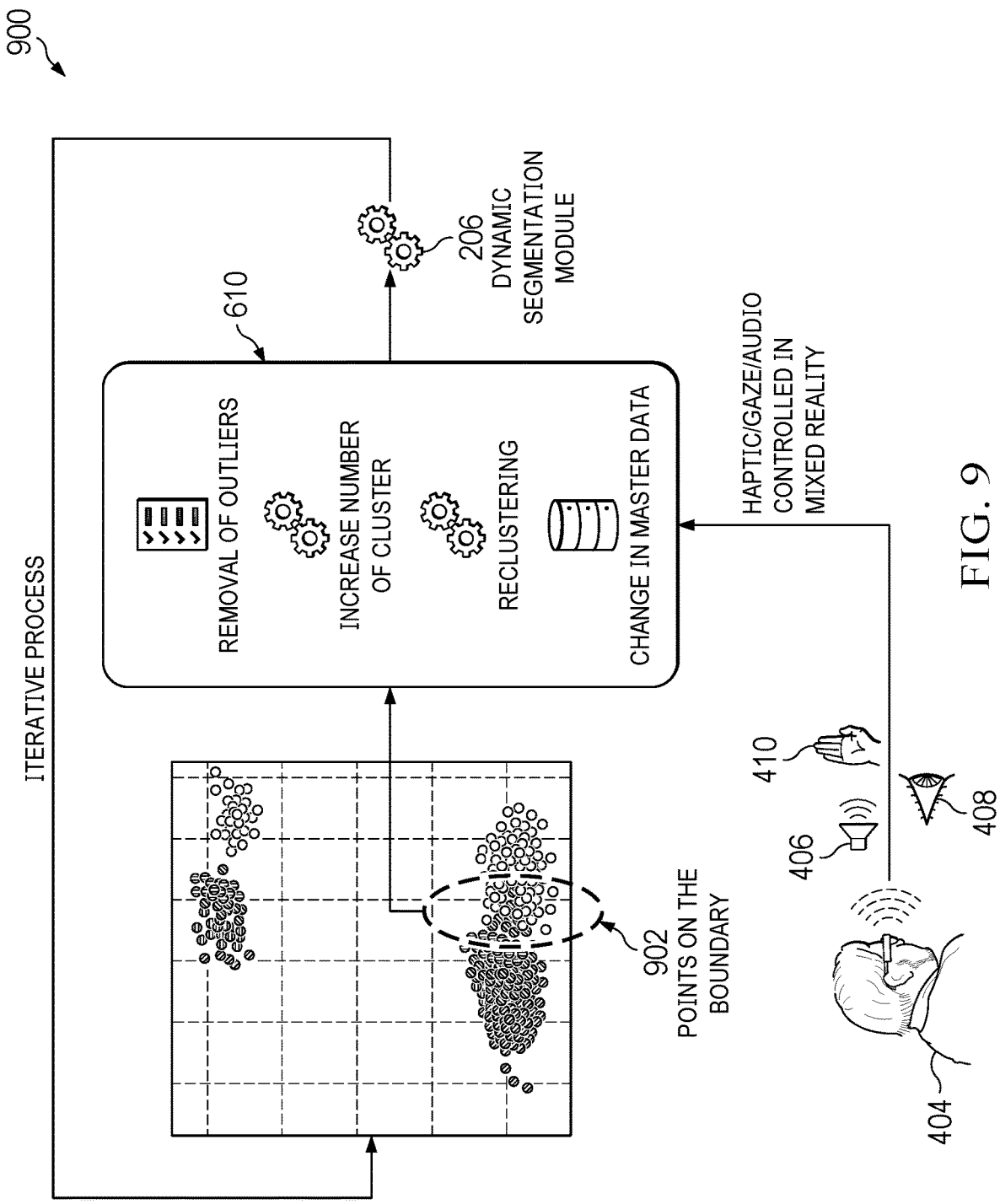
FIG. 9 illustrates a workflow for boundary handling, in accordance with an embodiment.

FIG. 9 illustrates workflow 900 for boundary handling, in accordance with an embodiment. Similar to outlier handling, as disclosed above in FIG. 8, boundary handling is an iterative process that updates the segments and clusters using outlier treatment actions 610 including removal of outliers, increasing the number of clusters, reclustering, or making changes in the master data. As disclosed above, mixed-reality visualization system 120 provides for handling data points, such as an extreme outlier, by adding it to a separate cluster. Mixed-reality visualization system 120 utilizes similar smart rendering techniques to provide boundary handling of data points, which identifies on which side of a cluster boundary that points on the boundary 902 are located.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of multi-dimension segmentation analysis and mixed-reality visualization, comprising:
    a supply chain network comprising one or more supply chain entities;
    a segmentation planner comprising a computer and memory, the segmentation planner configured to:
        access input data relating to one or more supply chain entities;

discover one or more features related to the input data;

pre-process the input data and features;

perform multi-dimension segmentation on the input data;

compute the importance of the one or more features;

generate a multi-dimension segmentation visualization;

display the multi-dimension segmentation visualization;

assign policy parameters to the multi-dimension segmentation performed on the input data;

detect outliers in the multi-dimension segmentation visualization; and generate a mixed-reality visualization comprising clusters and segmentation data displayed on one or more three-dimensional mixed-reality objects, wherein each row of the segmentation data is displayed as a data point, and each data point of a cluster is displayed with a similar visual appearance; and a mixed-reality visualization system, comprising one or more mixed-reality devices, each of the one or more mixed-reality devices comprising an imaging sensor, a processor and memory, and configured to:

display, via a mixed reality headset of at least one of the one or more mixed-reality devices, a spatial visualization comprising a quantity of the one or more three-dimensional mixed-reality objects equal to the number of dimensions of the segmentation data;

generate, via the mixed reality headset of the at least one of the one or more mixed-reality devices, a mixed-reality environment providing a sense of touching, feeling and manipulating the one or more three-dimensional mixed-reality objects;

detect, by the imaging sensor of the mixed reality headset, a head movement, a field of vision and a gaze of a user as the user navigates and interacts with the mixed-reality environment, wherein the imaging sensor comprises a camera module; and interact, via the mixed reality headset, with rendered visualizations using speech, eye movement, and spoken instructions to interact with and modify the supply chain network.

2. The system of claim 1, wherein the mixed-reality visualization system is further configured to:

modify the data points using one or more smart rendering techniques selected from the following:

vanishing the data points;

changing translucency;

replacing clusters by a single point at a centroid; and fusing the data points.

3. The system of claim 1, wherein the segmentation planner is further configured to update multi-dimension segmentation in response to the mixed-reality visualization system receiving user feedback.

4. The system of claim 3, wherein user feedback comprises one or more of the following:

removing outliers;

increasing the number of clusters;

regenerating the clusters; and making changes to the input data.

5. The system of claim 1, wherein the segmentation planner utilizes machine learning to perform multi-dimension segmentation and detect outliers.

6. The system of claim 1, wherein the mixed-reality visualization system receives user input from one or more mixed-reality devices.

7. The system of claim 6, wherein user input comprises one or more of the following:

voice inputs;

visual inputs; and physical inputs.

8. A computer-implemented method of multi-dimension segmentation analysis and mixed-reality visualization, comprising:

accessing input data relating to one or more supply chain entities;

discovering one or more features related to the input data;

pre-processing the input data and features;

performing multi-dimension segmentation on the input data;

computing the importance of the one or more features;

generating a multi-dimension segmentation visualization;

displaying the multi-dimension segmentation visualization;

assigning policy parameters to the multi-dimension segmentation performed on the input data;

detecting outliers in the multi-dimension segmentation visualization;

generating a mixed-reality visualization comprising clusters and segmentation data displayed on one or more three-dimensional mixed-reality objects, wherein each row of the segmentation data is displayed as a data point, and each data point of a cluster is displayed with a similar visual appearance;

displaying, via a mixed reality headset of at least one of one or more mixed-reality devices, a spatial visualization comprising a quantity of the one or more three-dimensional mixed-reality objects equal to the number of dimensions of the segmentation data;

generating, via the mixed reality headset of the at least one of the one or more mixed-reality devices, a mixed-reality environment providing a sense of touching, feeling and manipulating the one or more three-dimensional mixed-reality objects;

detecting, by an imaging sensor of the mixed reality headset, a head movement, a field of vision and a gaze of a user as the user navigates and interacts with the mixed-reality environment, wherein the imaging sensor comprises a camera module; and interacting, via the mixed reality headset, with rendered visualizations using speech, eye movement, and spoken instructions to interact with and modify the supply chain network.

9. The computer-implemented method of claim 8, further comprising:

modifying the data points using one or more smart rendering techniques selected from the following:

vanishing the data points;

changing translucency;

replacing clusters by a single point at a centroid; and fusing the data points.

10. The computer-implemented method of claim 8, further comprising the segmentation planner updating multi-dimension segmentation in response to the mixed-reality visualization system receiving user feedback.

11. The computer-implemented method of claim 10, wherein user feedback comprises one or more of the following:

removing outliers;

increasing the number of clusters;

regenerating the clusters; and making changes to the input data.

12. The computer-implemented method of claim 8, further comprising the segmentation planner utilizing machine learning to perform multi-dimension segmentation and detect outliers.

13. The computer-implemented method of claim 8, further comprising the mixed-reality visualization system receiving user input from one or more mixed-reality devices.

14. The computer-implemented method of claim 13, wherein user input comprises one or more of the following:

voice inputs;

visual inputs; and physical inputs.

15. A non-transitory computer-readable medium embodied with software providing multi-dimension segmentation analysis and mixed-reality visualization, the software when executed:

accesses input data relating to one or more supply chain entities;

discovers one or more features related to the input data;

pre-processes the input data and features;

performs multi-dimension segmentation on the input data;

computes the importance of the one or more features;

generates a multi-dimension segmentation visualization;

displays the multi-dimension segmentation visualization;

assigns policy parameters to the multi-dimension segmentation performed on the input data;

detects outliers in the multi-dimension segmentation visualization;

generates a mixed-reality visualization comprising clusters and segmentation data displayed on one or more three-dimensional mixed-reality objects, wherein each row of the segmentation data is displayed as a data point, and each data point of a cluster is displayed with a similar visual appearance;

displays, via a mixed reality headset of at least one of one or more mixed-reality devices, a spatial visualization comprising a quantity of the one or more three-dimensional mixed-reality objects equal to the number of dimensions of the segmentation data;

generates, via the mixed reality headset of the at least one of the one or more mixed-reality devices, a mixed-reality environment providing a sense of touching, feeling and manipulating the one or more three-dimensional mixed-reality objects;

detects, by an imaging sensor of the mixed reality headset, a head movement, a field of vision and a gaze of a user as the user navigates and interacts with the mixed-reality environment, wherein the imaging sensor comprises a camera module; and interacts, via the mixed reality headset, with rendered visualizations using speech, eye movement, and spoken instructions to interact with and modify the supply chain network.

16. The non-transitory computer-readable medium of claim 15, the software when executed further:

modifies the data points using one or more smart rendering techniques selected from the following:

vanishing the data points;

changing translucency;

replacing clusters by a single point at a centroid; and fusing the data points.

17. The non-transitory computer-readable medium of claim 15, the software when executed further updates multi-dimension segmentation in response to the mixed-reality visualization system receiving user feedback.

18. The non-transitory computer-readable medium of claim 17, wherein user feedback comprises one or more of the following:

removing outliers;

increasing the number of clusters;

regenerating the clusters; and making changes to the input data.

19. The non-transitory computer-readable medium of claim 15, the software when executed further utilizes machine learning to perform multi-dimension segmentation and detect outliers.

20. The non-transitory computer-readable medium of claim 15, the software when executed further receives user input from one or more mixed-reality devices.

* * * * *